(12) United States Patent
Rimmelspacher et al.

(10) Patent No.: US 7,216,886 B2
(45) Date of Patent: May 15, 2007

(54) TRAILER COUPLING

(75) Inventors: Bernhard Rimmelspacher, Rheinstetten (DE); Wolfgang Gentner, Ditzingen (DE); Joerg Riehle, Asperg (DE); Guenther Mayer, Boennigheim (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 106 days.

(21) Appl. No.: 11/039,081

(22) Filed: Jan. 18, 2005

(65) Prior Publication Data

US 2005/0167945 A1    Aug. 4, 2005

(30) Foreign Application Priority Data

Jan. 22, 2004    (DE) .................... 10 2004 004 503

(51) Int. Cl.
 *B60D 1/14*  (2006.01)
 *B60D 1/40*  (2006.01)
 *B60D 1/54*  (2006.01)

(52) U.S. Cl. ............... 280/491.3; 280/478.1; 280/491.1; 280/495

(58) Field of Classification Search ......... 280/479.1, 280/478.1, 491.1, 491.3, 495, 504
See application file for complete search history.

(56) References Cited

U.S. PATENT DOCUMENTS

| | | | | |
|---|---|---|---|---|
| 6,234,511 B1 * | 5/2001 | Gentner et al. | ......... | 280/479.1 |
| 6,409,201 B1 * | 6/2002 | Riehle | ............ | 280/491.1 |
| 6,547,271 B2 * | 4/2003 | Kleb et al. | ......... | 280/491.3 |
| 6,786,500 B2 * | 9/2004 | Kleb et al. | ......... | 280/491.1 |
| 6,860,503 B2 | 3/2005 | Aufderheide et al. | | |
| 2003/0075900 A1 | 4/2003 | Kleb et al. | | |
| 2004/0113391 A1 | 6/2004 | Aufderheide et al. | | |

FOREIGN PATENT DOCUMENTS

| | | |
|---|---|---|
| DE | 197 01 273 | 7/1997 |
| DE | 100 45 296 | 4/2001 |

(Continued)

*Primary Examiner*—Paul N. Dickson
*Assistant Examiner*—Marc A. Scharich
(74) *Attorney, Agent, or Firm*—Lipsitz & McAllister, LLC

(57) ABSTRACT

In order to provide a trailer coupling for motor vehicles comprising a bearing element, a towing element which can be pivoted in relation to the bearing element between an operative position and a rest position and displaced in the direction of the pivot axis between a pivoting position and a fixing position and a fixing device, with which the towing element can be fixed in position on the bearing element, with a simplified fixing of the towing element on the bearing element it is suggested that the towing element have a bearing member, that the bearing element have a receiving member, in which the bearing member engages at least in the fixing position and in relation to which the bearing member can be moved between the pivoting position and the fixing position in a direction of displacement and vice versa, and that the fixing device have a blocking device which blocks the bearing member with respect to any movement in the direction of displacement relative to the receiving member and has at least one blocking member arranged in one of the elements and movable from a release position in the direction of a blocking position acted upon by a force and at least one blocking surface which is arranged on the other one of the elements and behind which the blocking member engages in the blocking position.

47 Claims, 18 Drawing Sheets

FOREIGN PATENT DOCUMENTS

| | | |
|---|---|---|
| DE | 101 44 254 | 4/2003 |
| DE | 103 20 302 | 12/2004 |
| EP | 1 024 036 | 8/2000 |
| EP | 1 275 533 | 1/2003 |
| EP | 1 288 026 | 3/2003 |
| EP | 1 428 697 | 6/2004 |
| EP | 1 504 928 | 2/2005 |

* cited by examiner

TRAILER COUPLING

The present disclosure relates to the subject matter disclosed in German application No. 10 2004 004 503.8 of Jan. 22, 2004, which is incorporated herein by reference in its entirety and for all purposes.

BACKGROUND OF THE INVENTION

Trailer coupling for motor vehicles comprising a bearing element, a towing element which is pivotable in relation to the bearing element about a pivot axis of a pivot bearing between an operative position and a rest position and is displaceable in the direction of the pivot axis between a pivoting position and a fixing position at least in the operative position and a fixing device, with which the towing element can be fixed in position on the bearing element so as to be unmovable at least in the operative position and upon reaching the fixing position.

Trailer couplings of this type are known, for example, from DE 100 17 013.

In their case, the fixing of the towing element in the fixing position is resolved with considerable ease of operation but in a constructionally complex manner.

The object underlying the invention is therefore to provide a trailer coupling with a simplified fixing of the towing element on the bearing element.

SUMMARY OF THE INVENTION

This object is accomplished in accordance with the invention, in a trailer coupling of the type described at the outset, in that the towing element has a bearing member, that the bearing element has a receiving member, in which the bearing member engages at least in the fixing position and in relation to which the bearing member can be moved between the pivoting position and the fixing position in a direction of displacement and vice versa and that the fixing device has a blocking device which blocks the bearing member with respect to any movement in the direction of displacement relative to the receiving member and has at least one blocking member which is arranged in one of the elements and can be moved from a release position in the direction of a blocking position acted upon by a force and at least one blocking surface which is arranged on the other one of the elements and behind which the blocking member engages in the blocking position.

The advantage of the inventive solution is to be seen in the fact that with the provision of a blocking member and a blocking surface a simple possibility is given for blocking the bearing member in the fixing position which offers, in addition, adequate operational safety in the blocking position of the blocking member.

In order to fix the towing element securely on the bearing element, it is particularly favorable when the bearing member mounts the towing element in relation to the receiving member not only in the pivoting position but also in the fixing position, wherein the mounting in the pivoting position represents a rotatable mounting whereas in the fixing position the mounting of the bearing member in the receiving member is brought about in the sense of a secure support of the towing element in relation to the bearing element.

A particularly favorable design of the towing element provides for this to have a first end bearing the coupling ball as well as a second, free end.

With respect to the arrangement of the bearing member, no further details have likewise been given. It is preferably provided, for example, for the bearing member to be arranged on the towing element between the ball neck and the free end.

Furthermore, no further details have likewise been given with respect to the design of the receiving member. It is particularly favorable when the receiving member has a first opening, through which the bearing member engages in the receiving member proceeding from the ball neck, and a second opening located opposite the first opening.

In order to be able to move the blocking member in a simple manner from the release position into the blocking position, it is preferably provided for the blocking device to have a blocking member drive, with which the blocking member can be acted upon with a force moving it from the release position in the direction of the blocking position.

Such a blocking member drive can be designed in the most varied of ways.

For example, it would be conceivable to act on the blocking member directly with a pressure spring.

A particularly expedient solution provides for the blocking member drive to have a drive element, with which the blocking member can be moved from the release position into the blocking position.

In this respect, the drive element is preferably acted upon by an elastic force storing means so that it is possible to keep the drive element always acted upon with the force of the elastic force storing means and, therefore, it can always act on the blocking member.

With respect to the possibilities for moving the drive element, no further details have so far been given.

It would, for example, be conceivable to design the drive element such that as a result of relative rotation thereof in relation to the blocking member a displacement of the at least one blocking member is possible.

It has proven to be constructionally favorable when the drive element is arranged so as to be displaceable in an activating direction relative to the element accommodating it, i.e., in the case of the accommodation of the drive element in the bearing member relative to the bearing member since the blocking member can be actuated in a simple manner with a linear displaceability of this type.

The actuation of the blocking member may be realized in a favorable and reliable manner when the drive element has a connecting drive link with a receiving means, into which the at least one blocking member dips in the release position, and a displacement surface, with which the at least one blocking member can be moved from the release position into the blocking position. With a displacement surface of this type, the blocking member may be moved from the release position into the blocking position in a simple manner and, in particular, reliably.

In order to not only hold the blocking member in the blocking position but also to be able to move the blocking member in a readjusting manner in the direction of the blocking surface when play occurs, it is preferably provided for a wedge surface, which acts on the blocking member in the blocking position in a readjusting manner in the direction of movement, to adjoin the displacement surface.

In order to also avoid any play caused by wear and tear, it is particularly favorable when the blocking device acts on the form-locking fixing elements in a clearance-free, readjusting manner so that any play occurring due to wear and tear can likewise be avoided by the readjusting action of the blocking device.

It has proven to be particularly advantageous when the blocking device, in the blocking position of the at least one blocking member, acts on the bearing member with a force in the direction of the fixing position on account of the interaction of the blocking member with the blocking surface so that, as a result, a permanent, secure fixing of the towing element in the bearing element can be achieved.

In this respect, it is particularly favorable when the blocking device holds form-locking fixing elements of the fixing device in clearance-free engagement and, therefore, the towing element can, altogether, be fixed in position free of clearance relative to the bearing element.

The interaction of the blocking member with the blocking surface results, in a particularly simple manner, in the bearing member being acted upon in the direction of the fixing position when the blocking surface extends at an angle or inclined in relation to the direction of movement.

In principle, it would be conceivable to provide the at least one blocking member and the blocking member drive in the bearing element.

However, from a constructional point of view a particularly favorable embodiment provides for the at least one blocking member and the blocking member drive to be arranged in the bearing member and, therefore, to be movable along with the bearing member.

As for the rest, such a solution also has the advantage that a very space-saving integration of the blocking member and the blocking member drive is possible with it.

Furthermore, it is favorable when the at least one blocking member is guided in the bearing member so as to be movable between the release position and the blocking position in a direction of movement transverse to the direction of displacement thereof.

With respect to the design of the blocking device with a view to actuation of the blocking member drive, no further details have so far been given. Any conceivable actuation of the blocking member drive is, for example, possible.

It is, however, particularly favorable when the blocking device comprises an actuating device which acts on the blocking member drive and which can act on the drive element contrary to the force of the elastic force storing means.

With respect to the action on the blocking member drive it would be conceivable to arrange the actuation means on the same element as the blocking member drive.

With the arrangement of the blocking member drive on the towing element, the consequence would be that the actuating device would also be arranged on the towing element.

With respect to operability of the actuating device it is, however, of advantage when the actuating device is arranged on the bearing element and the blocking member drive on the towing element.

In this case, it is expedient when an actuating element of the actuating device projects beyond the free end of the towing element and, therefore, it is possible to act on the drive element via the actuating element.

For this purpose, the actuating element is expediently arranged coaxially to the pivot axis so that any rotation of the towing element about the pivot axis may be cushioned in a simple manner from a constructional point of view.

For example, it would be conceivable to provide the actuating element with a rotary coupling.

It is, however, particularly simple from a constructional point of view when the actuating element is mounted in the towing element so as to be rotatable about the pivot axis.

The action on the blocking member drive may be realized in a particularly simple manner when the actuating element can be acted upon in the direction of the free end of the towing element in its area projecting beyond the free end of the towing element in order to neutralize the force of the elastic force storing means acting on the drive element.

Furthermore, it is particularly favorable when the towing element can be displaced from the fixing position into the pivoting position with the actuating device when the blocking member is located in release position so that the actuating device is used not only for the purpose of acting on the blocking member drive in order to move the at least one blocking member from the blocking position into the release position but rather the actuating device can also be used at the same time for the purpose of displacing the towing element from the fixing position actively into the pivoting position.

In addition, the actuating device may be advantageously used not only for the purpose of displacing the towing element into the pivoting position but also for the purpose of positioning the towing element in the pivoting position in a defined manner in the direction of displacement, i.e., holding it in the direction of displacement in a defined position, which is associated with the pivoting position, relative to the bearing element so that the bearing member has the possibility of forming the pivot bearing for the towing element together with the receiving member.

The action of the actuating device on the actuating element can be brought about in the most varied of ways.

One embodiment, for example, provides for the actuating element to be coupled to a guide lever of the actuating device.

For example, it is provided in the case where the actuating device is arranged on the bearing element for the guide lever to be pivotally mounted on the bearing element so that the actuating element can be acted upon as a result of pivoting of the guide lever, thereby using the lever laws.

Alternatively thereto, it is provided for the actuating element to be designed as a toothed rack which meshes with a pinion of the actuating device so that it is possible with the actuating device to act on the actuating element as a result of rotation of the pinion.

With respect to the design of the actuating device itself, no further details have so far been given. Each actuating device is provided, for example, with an operative element, preferably for acting manually on the actuating element.

In order to create the possibility of terminating the manual action prior to the towing element returning to the fixing position, in particular, in order to create the possibility of acting manually on the actuating device only for the purpose of having the towing element transfer from the fixing position into the pivoting position, it is expedient when the actuating device is provided with a free-wheeling means provided between the actuating element and the operative element.

With respect to the question of whether the release position of the blocking members is maintained in the pivoting position or not, no further details have so far been given. It would be conceivable, for example, to transfer the at least one blocking member in the free-wheeling position into a blocking position again, in which it maintains the pivoting position in a defined manner.

Another possibility provides for the at least one blocking member to be secured in position relative to the bearing member due to locking of the drive element and, therefore, for the force of the elastic force storing means of the blocking member drive acting on the blocking member to be blocked.

A particularly simple possibility provides, however, for the receiving member to hold the at least one blocking member in the release position in the pivoting position of the towing element.

This may be realized particularly easily in that the receiving member has a surface acting on the at least one blocking member.

With respect to the special design of the blocking device, in particular, when the blocking member drive and the blocking members are arranged on the towing element, no further details have so far been given. One expedient solution provides, for example, for the at least one blocking member to be provided on the towing element on a side of the bearing member facing away from the ball neck.

The at least one blocking member is expediently arranged so as to be guided in the direction of movement in lateral guide openings of the towing element.

The guide openings can, in principle, be arranged at any optional location of the towing element. It is particularly expedient when the lateral guide openings are arranged close to the free end of the towing element.

No further details have likewise been given concerning the arrangement of the drive element in the towing element. It is preferably provided, for example, for the drive element to be arranged in a recess in the towing element.

In this respect, the recess is favorably designed such that it extends into the towing element from an opening provided at the free end of the towing element.

The recess could extend parallel or at an angle to the pivot axis.

One favorable solution provides, however, for the recess to extend coaxially to the pivot axis.

With respect to the support of the elastic force storing means which acts on the drive element, it is expediently provided for the elastic force storing means to be supported on a base of the recess located opposite the opening.

With respect to the fixing of the towing element relative to the bearing element, no further details have so far been given.

It is provided, for example, alternatively or in addition to the embodiments described so far for the bearing element to have a receiving member with an opening, proceeding from which a bearing member of the towing element engages in the receiving member, and for the towing element to have a first form-locking element which is not in engagement with a second form-locking element provided on the receiving member in the pivoting position of the towing element and which can be brought into engagement with the second form-locking element of the receiving member at least in the operative position during the displacement of the towing element from the pivoting position into the fixing position.

In order to be able to bring the first and the second form-locking elements into engagement in a simple manner, it is provided in a constructionally expedient solution for the second form-locking element to be arranged on a side of the receiving member facing the ball neck.

In this respect, it is particularly favorable when the second form-locking element is arranged in an end area of the receiving member.

In order to be able to produce the second form-locking element in as simple a manner as possible, it is preferably provided for the second form-locking element to be integrally formed on the receiving member.

Furthermore, it is expediently provided for the first form-locking element to be integrally formed on the towing element.

The position of the first form-locking element is preferably selected such that the first form-locking element is arranged in the area of a transition from the ball neck to the bearing member.

In order, in addition, to be able to fix the towing element in a form-locking manner in the rest position, it is preferably provided for the receiving member to have a third form-locking element, with which the first form-locking element can be brought into engagement in the rest position.

In this respect, the third form-locking element is expediently of an identical design to the second form-locking element.

In order to ensure that the towing element can transfer from the pivoting position into the fixing position relative to the bearing element only in the operative position and in the rest position, it is preferably provided for the bearing member to have a guide path, on which a guide element arranged on the towing element rests when the towing element is outside the operative position and the rest position.

Additional features and advantages of the invention are the subject matter of the following description as well as the drawings illustrating several embodiments.

DETAILED DESCRIPTION OF THE INVENTION

Figure 1:
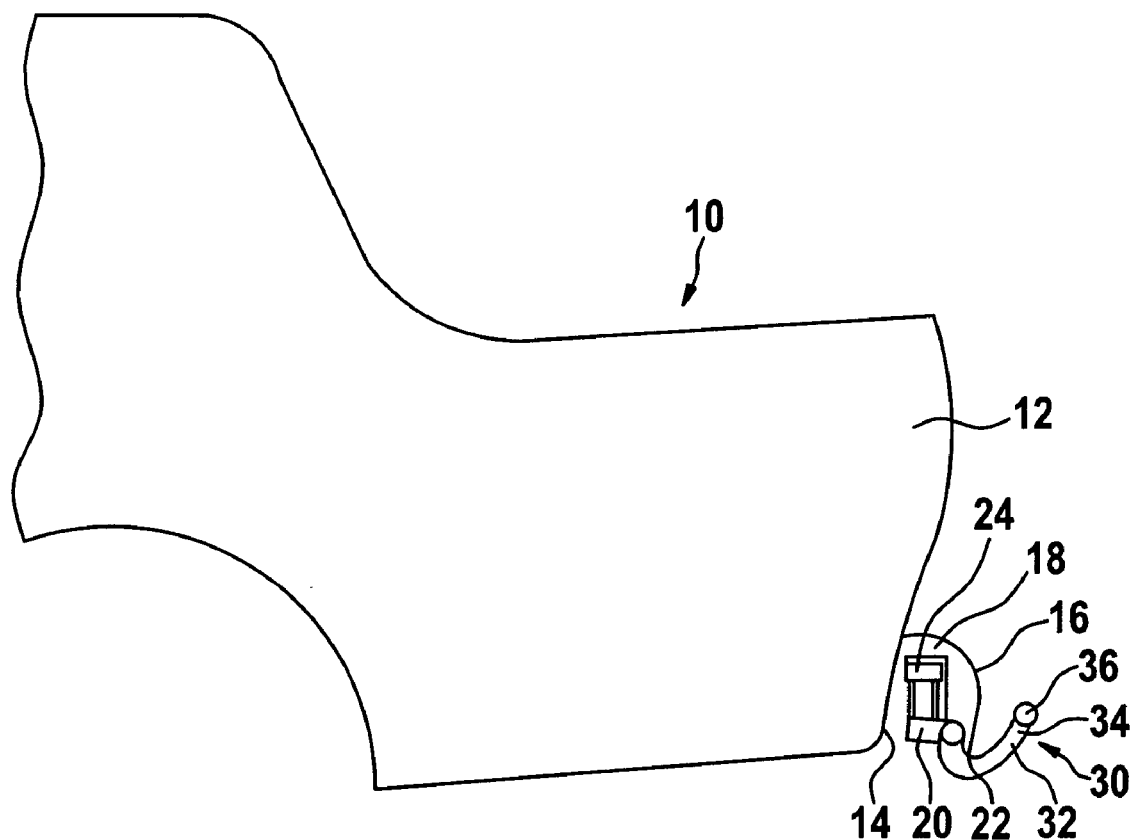
FIG. 1 shows a schematic illustration of a first embodiment of an inventive trailer coupling mounted on a rear end of a vehicle.

A first embodiment of an inventive trailer coupling is, as illustrated in FIG. 1, mounted on a vehicle body 10, namely between a rear side 14 of the rear end area 12 and a bumper 16. A bearing element 20 of the trailer coupling is arranged in a space 18 formed between the rear side 14 and the bumper 16 and above a lower edge 22 of the bumper 16 and this bearing element is held by a cross bar 24 which is connected to the vehicle body 10 and likewise extends in the space 18.

A towing element designated as a whole as 30 is mounted on the bearing element 20 so as to be movable, wherein the towing element has a ball neck 32 which bears a coupling ball 36 at a first end 34. In an operative position illustrated in FIG. 2, the coupling ball 36 is arranged such that it is intersected symmetrically by a longitudinal central plane 38 of the vehicle body 10 and, therefore, the longitudinal central plane also extends through a central point 40 of the coupling ball 36.

Furthermore, at least one first area 42 of the ball neck 32 proceeding from the first end 34 of the ball neck 32 likewise extends symmetrically to the longitudinal central plane 28 and subsequently leads to a second end 48 of the ball neck 32 by means of a bend 44.

Figure 2:
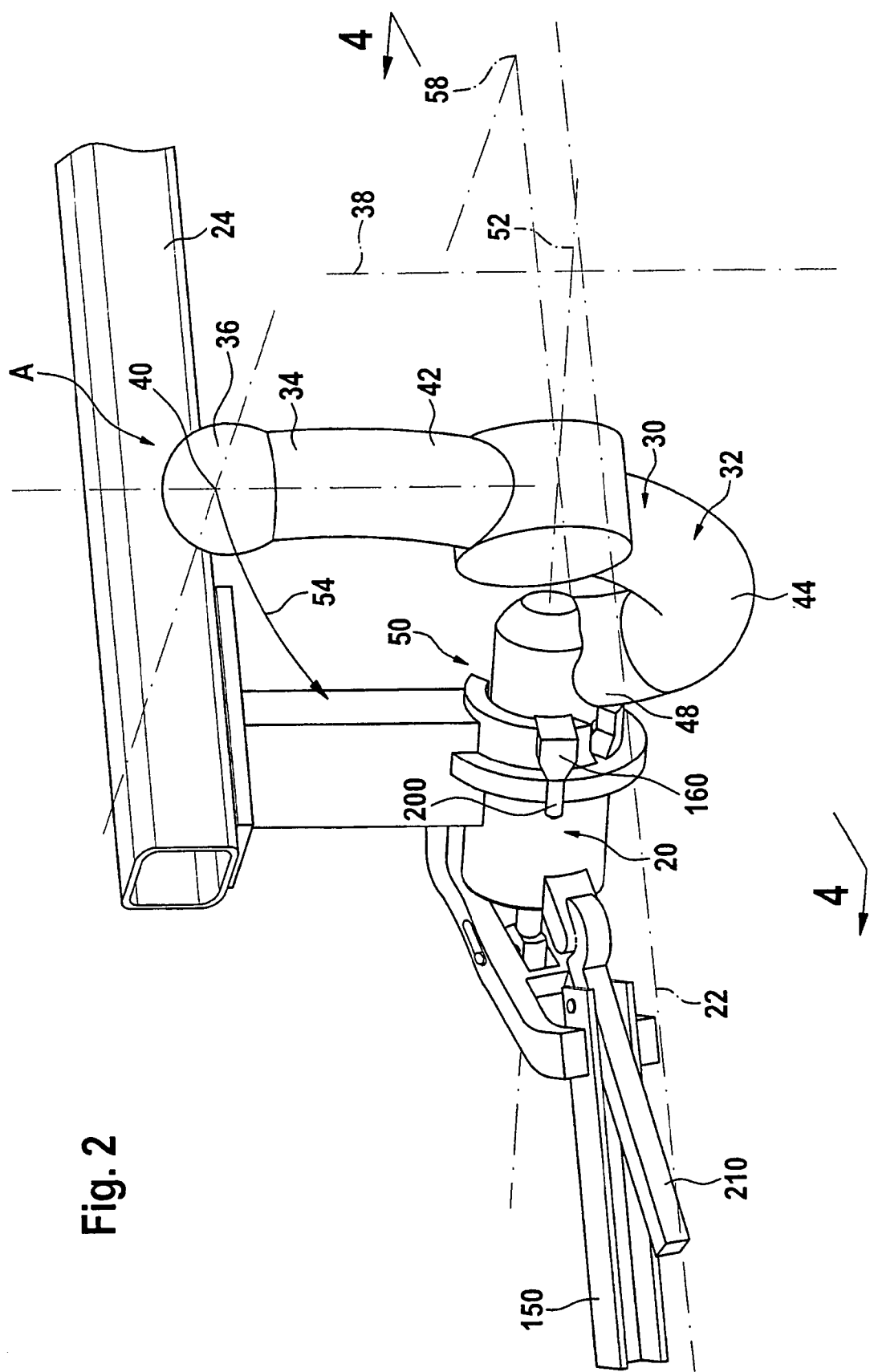
FIG. 2 shows a perspective illustration of the first embodiment of an inventive trailer coupling with a towing element in an operative position.
Figure 3:
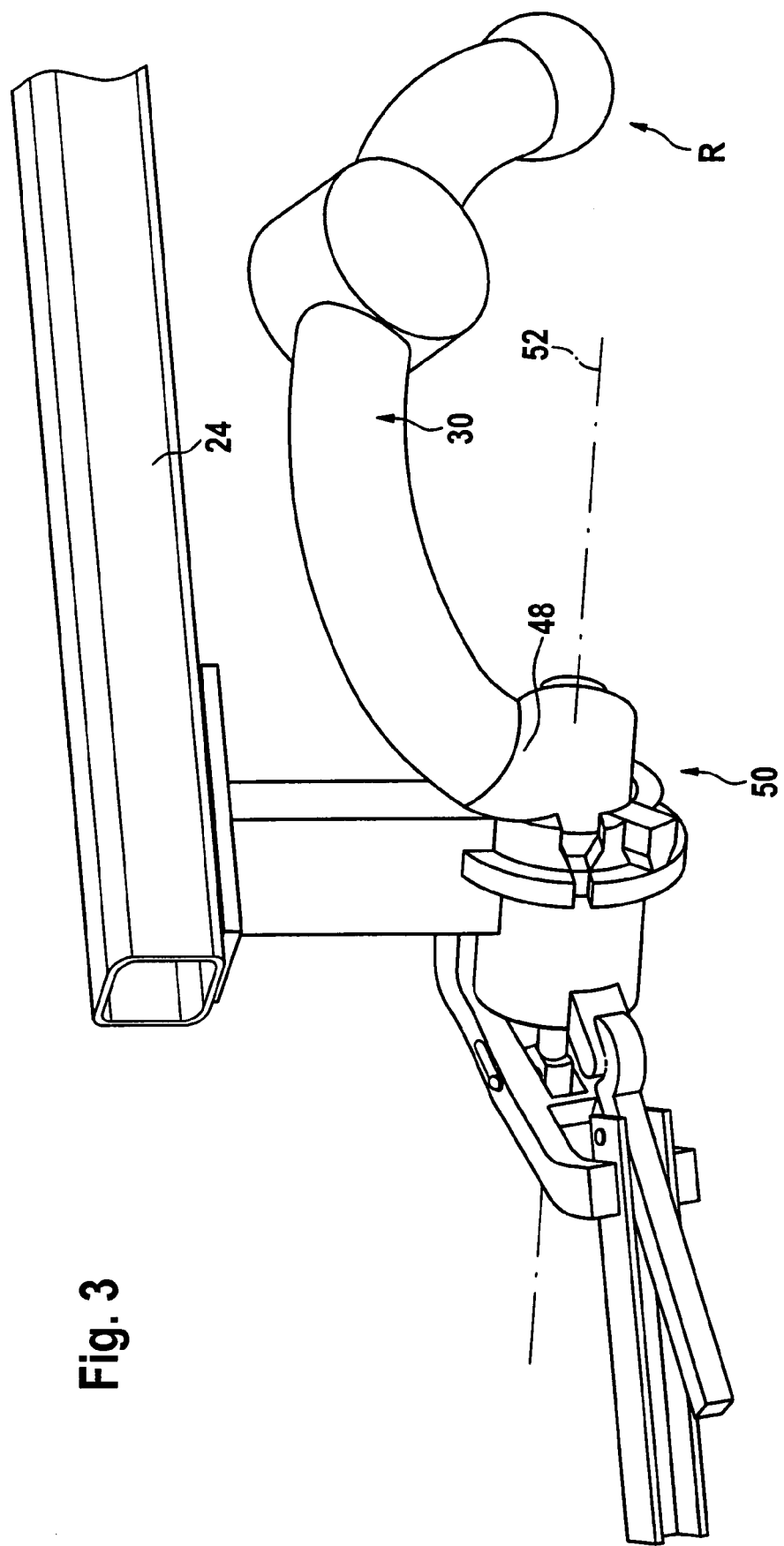
FIG. 3 shows a perspective illustration similar to FIG. 2 with a towing element in rest position.

The towing element 30 is, for its part, mounted on the bearing element 20 so as to be pivotable about a pivot axis 52 by means of a pivot bearing designated as a whole as 50, wherein the towing element 30 can be positioned as a result of pivoting about the pivot axis 52 either in the operative position A illustrated in FIG. 2 or in a rest position R which is illustrated in FIG. 3, is covered essentially by the bumper 16 and is located in the space 18, wherein a pivoting movement about the pivot axis 52 from the operative position A into the rest position R takes place through an angle of more than 180° in a pivoting direction 54 extending in the opposite direction to the clockwise direction and a pivoting movement from the rest position R into the operative position A takes place in the opposite manner in the clockwise direction.

The pivot axis 52 extends, as illustrated in FIGS. 2 and 3, at an angle to the longitudinal central plane 38 and preferably also at an angle to a horizontal plane 58, namely descending in relation to the horizontal plane 58 in the opposite direction to a direction of travel. As a result, the ball neck 32 passes each time underneath the lower edge 22 of the bumper 16 during the pivoting between the operative position A and the rest position R.

Figure 4:
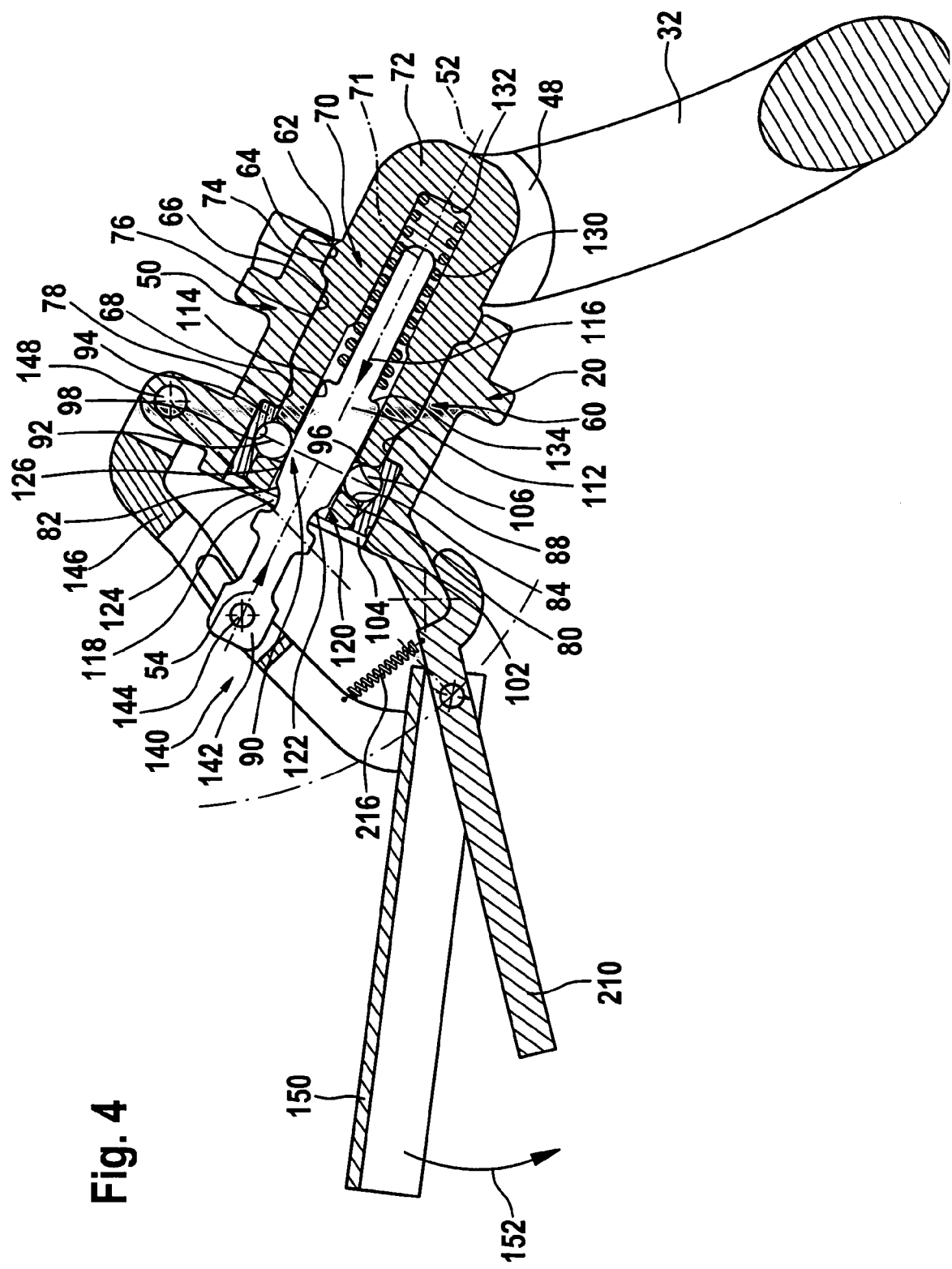
FIG. 4 shows a section along line 4—4 in FIG. 2 with a towing element in fixing position.

As illustrated in FIG. 4, the pivot bearing 50 is formed by a receiving member which is comprised by the bearing element 20 and has, proceeding from an opening 62 facing the ball neck 32, a first receiving surface 64 cylindrical in relation to the pivot axis 52 and a second cylindrical receiving surface 66, which is arranged on a side of the first cylindrical receiving surface 64 facing away from the opening 62 and has a smaller diameter than the first cylindrical receiving surface, and, in continuation of the second cylindrical receiving surface 66, has a third cylindrical receiving surface 68 which has a diameter likewise reduced in comparison with the second cylindrical receiving surface 66 and is arranged on a side of the second cylindrical receiving surface 66 located opposite the first cylindrical receiving surface 64.

A bearing member designated as a whole as 70 is seated in the receiving member 60 and, in a fixing position illustrated in FIG. 4, abuts on the first cylindrical receiving surface 64 with a first casing surface 74 which is cylindrical in relation to its longitudinal axis 71 and, therefore, also to the pivot axis 52; the bearing member also abuts on the second cylindrical receiving surface 66 with a second casing surface 76 cylindrical in relation to the pivot axis 52 and abuts on the third cylindrical receiving surface 68 with a third cylindrical casing surface 78.

In addition, the bearing member 70 continues beyond the third cylindrical casing surface 78 with a guide section 80 which extends as far as a second end 82 of the bearing member 70 located opposite the first end 72 of the bearing member 70.

Blocking members 88 of a blocking device designated as a whole as 90 are arranged in the guide section 80 in guide openings 84 extending transversely to the pivot axis 52; these blocking members can be moved in a direction of movement 92 transversely to the pivot axis 52, namely such that they can engage behind blocking surfaces 98 which are provided in an insert member 94 of the bearing element 20, are formed by a groove 96 extending around the pivot axis 52 and extend at an angle to the direction of movement 92.

In this respect, the insert member 94 is arranged in the bearing element 20 in such a manner that it adjoins the receiving member 60 and is preferably seated in a recess 102 which extends into the bearing element 20 from an opening 104 of the bearing element 20 located opposite the opening 62 so that the insert member 94 is held in the bearing element 20 concentrically to the pivot axis 52 and, with a cylindrical inner surface 104 adjoining the groove 96, extends in alignment with the third cylindrical receiving surface 68 as far as an opening 108.

For the purpose of moving the blocking members 88 in the direction of movement 92, a blocking member drive designated as a whole as 110 is provided and this has a drive element 112 which is arranged in a receiving bore 114, which extends into the bearing member 70 as far as the first end 72 proceeding from an opening 118 provided at the end 82 and is preferably coaxial to the pivot axis 52, and can be displaced in this bore relative to the bearing member 70 in an activating direction 116.

For the displacement of the blocking members 88, the drive element 112 has a connecting drive link 120 which comprises a receiving means 122 for the blocking members 88, a displacement surface 124 for the blocking members 88 adjoining the receiving means 122 and a wedge surface 126 for the blocking members 88 adjoining the displacement surface 124.

The drive element 112 of the blocking member drive is, in addition, provided with a guide pin 128 which engages in an interior of an elastic force storing means 130 which is supported, on the one hand, on a base 132 of the receiving bore 114 and, on the other hand, acts on the drive element 112 with a force in the area of an annular flange 134 in such a manner that the drive element 112 always has the tendency to be displaced in the direction of an active position to such an extent that the connecting drive link 120 acts on the blocking members 88 located in a blocking position with the wedge surface 126 and, therefore, always acts on the blocking members 88 with a force contrary to the blocking surfaces 98, as illustrated in FIG. 4, so that the bearing member 70 is also drawn into the receiving member 60 as far as possible in the fixing position.

In order to counteract the elastic force storing means 130, the blocking device 90 comprises an actuating device which is designated as a whole as 140 and has an actuating element 142 which is integrally formed on the drive element 112, extends coaxially to the pivot axis 52 in continuation of the drive element 112 through the opening 118 and beyond the second end 82 of the bearing member 70 and is connected via a joint 144 to a guide lever 146 which is mounted on one side of the bearing element 20 with a pivot joint 148 and extends beyond the opening 108 of the receiving element 20 proceeding from the pivot joint 148 and bears an actuating lever 150 on its side located opposite the pivot joint 148.

As a result of the actuating lever 150 being acted upon in a pulling direction 152, the guide lever 146 moves in the direction of the opening 108 and, therefore, the actuating element 142 is acted upon in an actuating direction 144, in which the actuating element 142 pushes the drive element 112 of the blocking member drive 110 into the receiving bore 114 contrary to the action of the elastic storing means 130.

Figure 5:
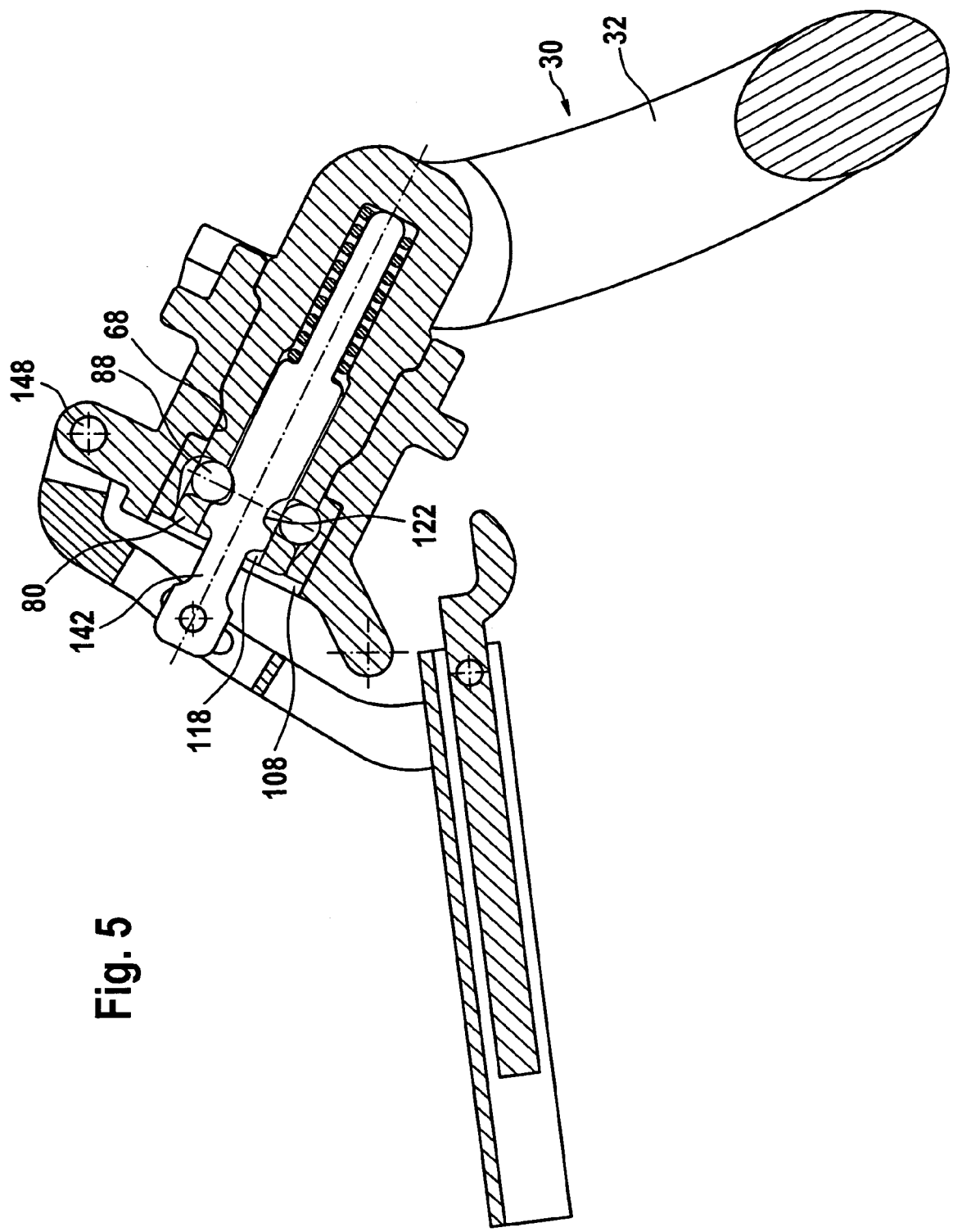
FIG. 5 shows a section similar to FIG. 4 immediately after the transfer of blocking members into a release position.
Figure 6:
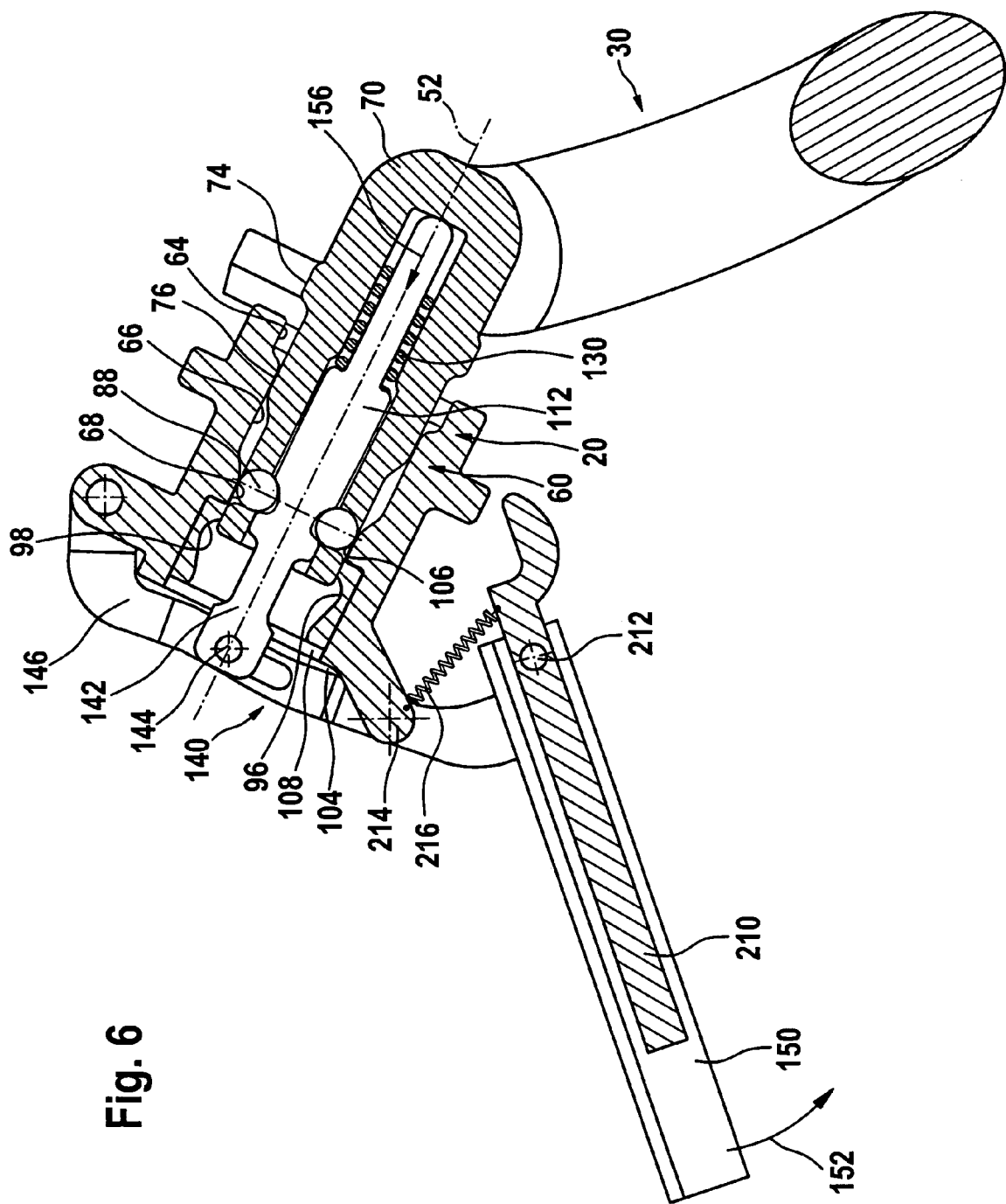
FIG. 6 shows a section similar to FIG. 4 upon reaching a pivoting position of the towing element.

As a result, the connecting drive link 120 no longer acts on the blocking members 88 with the wedge surfaces 126 but rather, first of all, with the displacement surfaces 124 and is then pushed in further until, as illustrated in FIG. 5, the blocking members 88 can dip into the receiving means 122 and can, therefore, move out of their blocking position into their release position, in which the blocking members 88 no longer project beyond the outer side of the guide section 80 and so the guide section 80 can be displaced in the direction of the third cylindrical receiving surface 68, as illustrated in FIG. 6.

In this position, the entire bearing member 70 is displaced into a pivoting position, in which the entire towing element 30 can be freely rotated about the pivot axis 52.

The free rotatability of the towing element 30 in the pivoting position illustrated in FIG. 6 results from the fact that in the pivoting position illustrated in FIG. 6 the entire bearing member 70 has been displaced as a result of the action of the actuating device 140 in the direction of its longitudinal axis 71 and, therefore, also relative to the pivot axis 52 in the opposite direction to a direction of displacement 156, wherein in the pivoting position, for example, the guide lever 146 rests on a limit stop of the bearing element 20, for example, an end face thereof.

As a result of the displacement of the bearing member 70 in the opposite direction to the direction of displacement 156, the first cylindrical casing surface 74 is, for example, displaced to such an extent that this is arranged so as to be offset in comparison with the first cylindrical receiving surface 64 in the direction of the longitudinal axis 71.

Only the second cylindrical casing surface 76 still abuts in partial areas on partial areas of the second cylindrical receiving surface 66.

Figure 7:
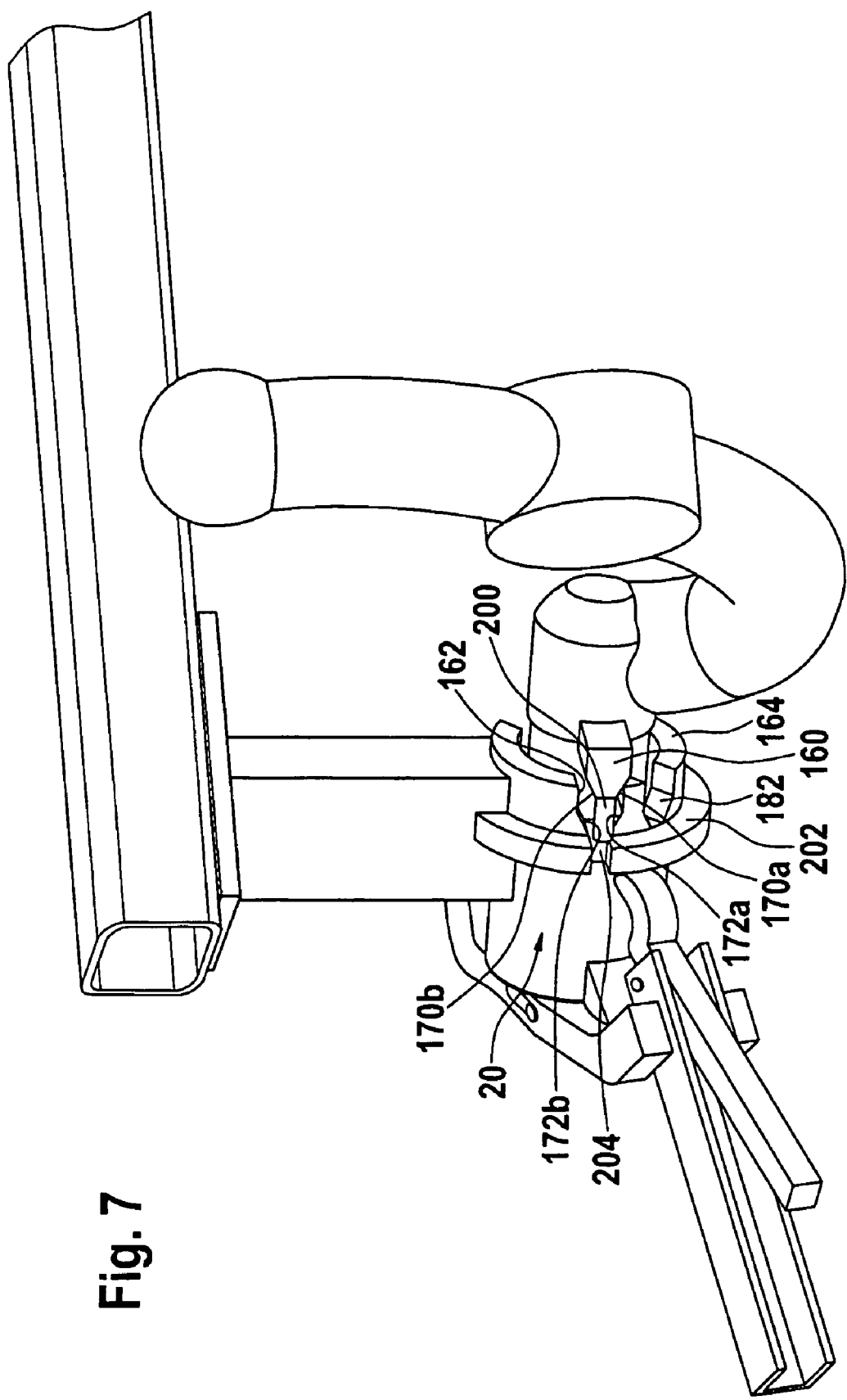
FIG. 7 shows a perspective illustration similar to FIG. 2 with a towing element in pivoting position and in operative position.
Figure 8:
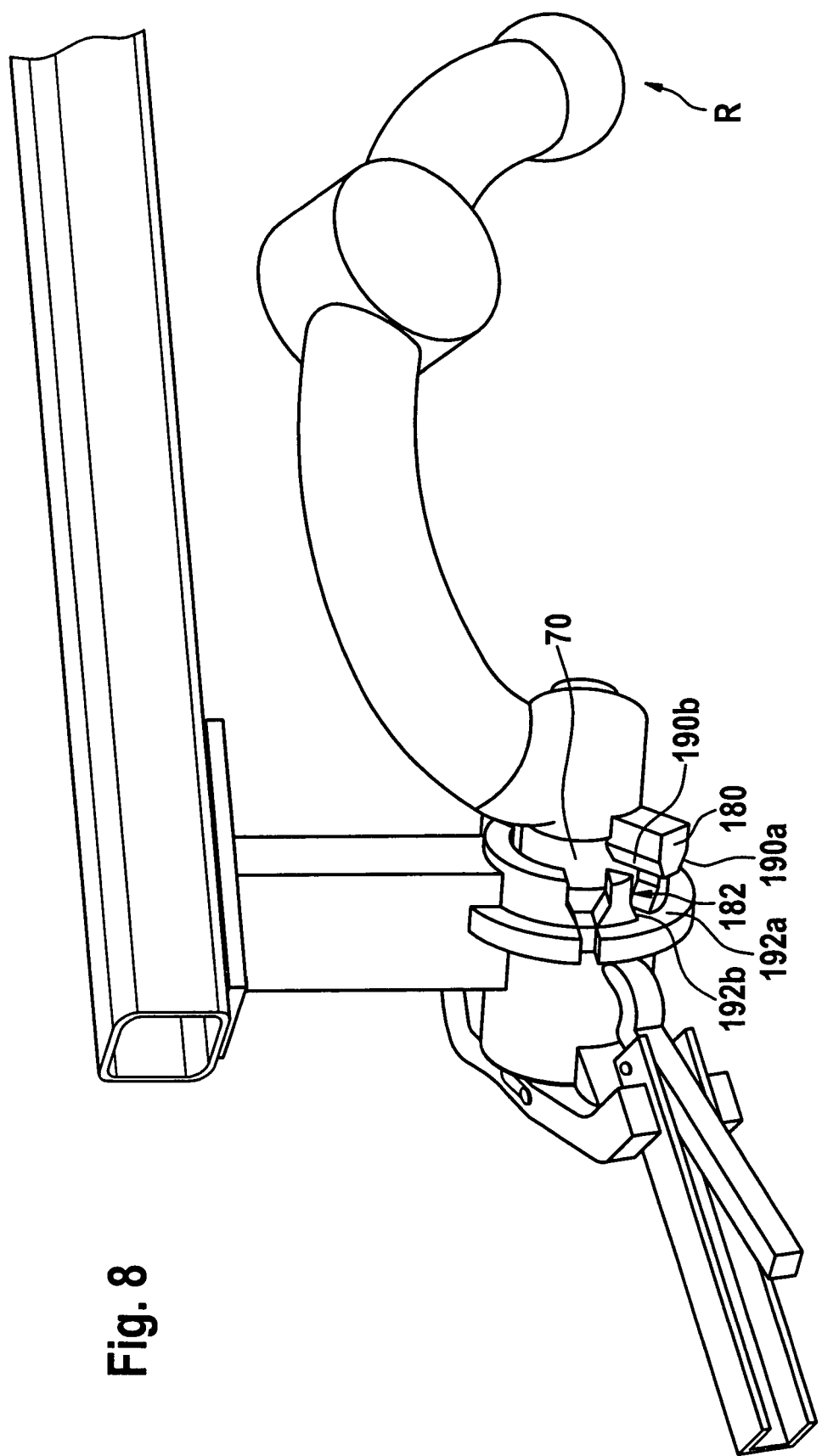
FIG. 8 shows a perspective illustration similar to FIG. 3 with a towing element in pivoting position and rest position.
Figure 9:
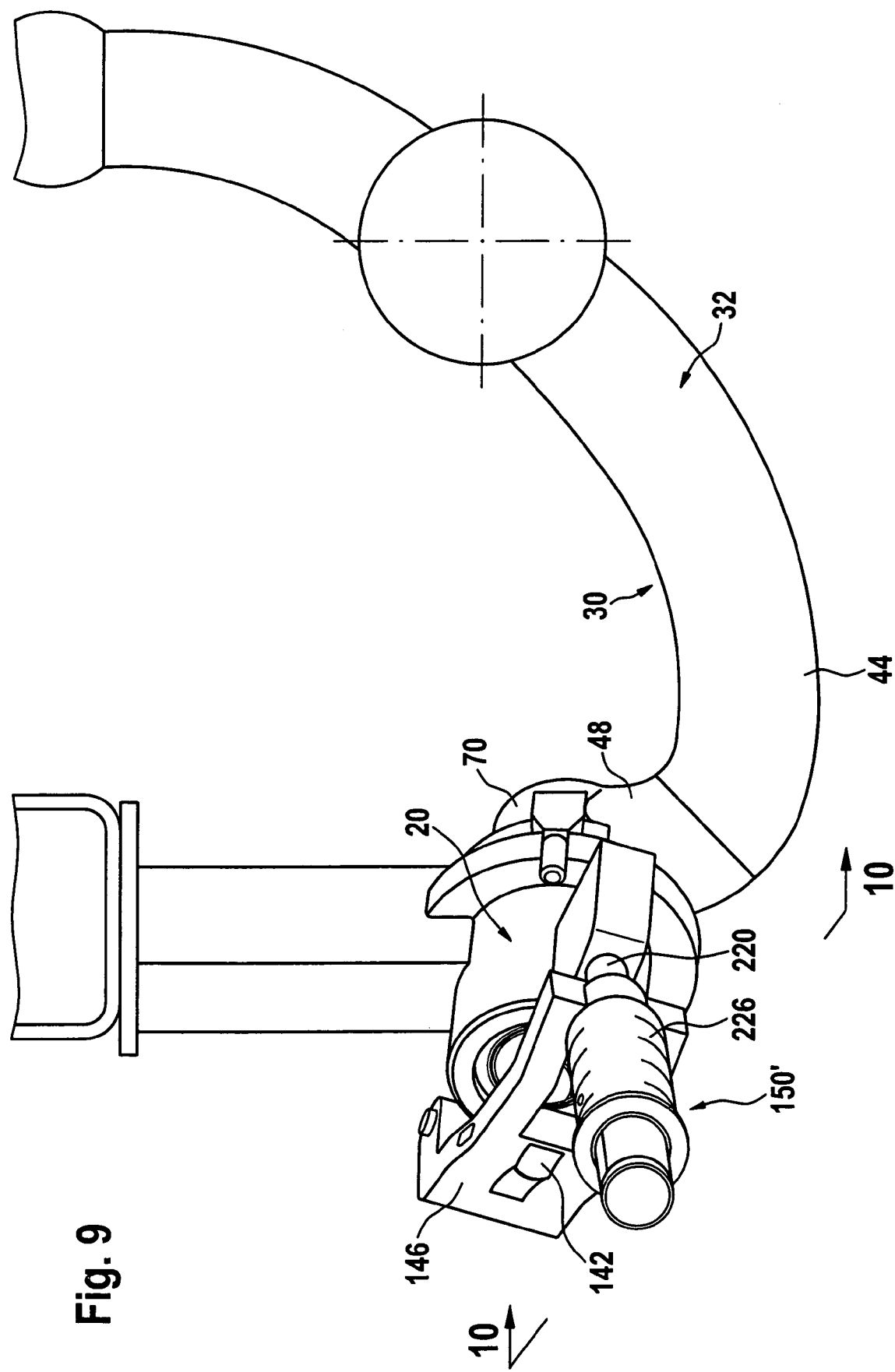
FIG. 9 shows an illustration similar to FIG. 2 of a second embodiment of an inventive trailer coupling.
Figure 10:
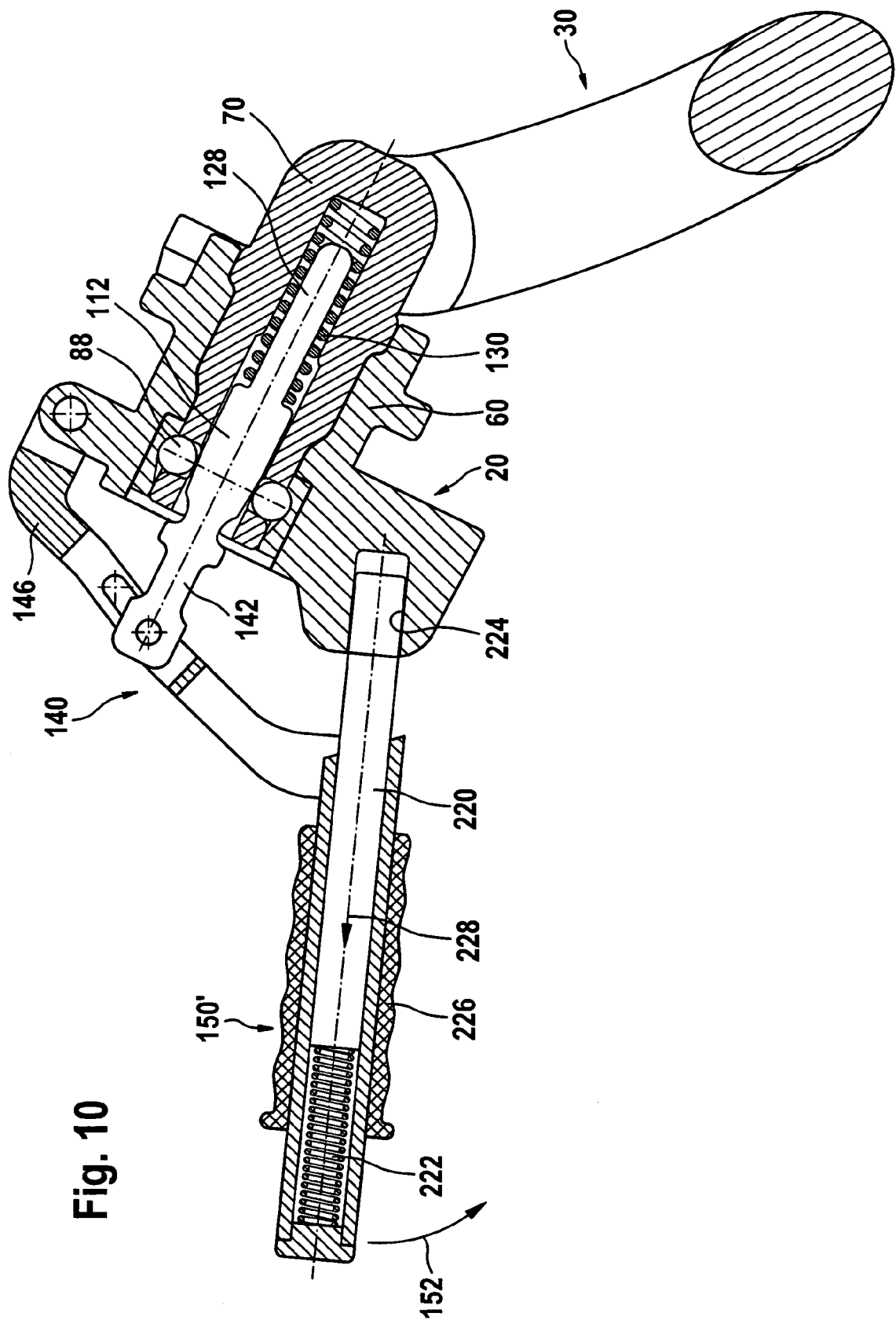
FIG. 10 shows a section along line 10—10 in FIG. 9 with an actuating device locked in fixing position.
Figure 11:
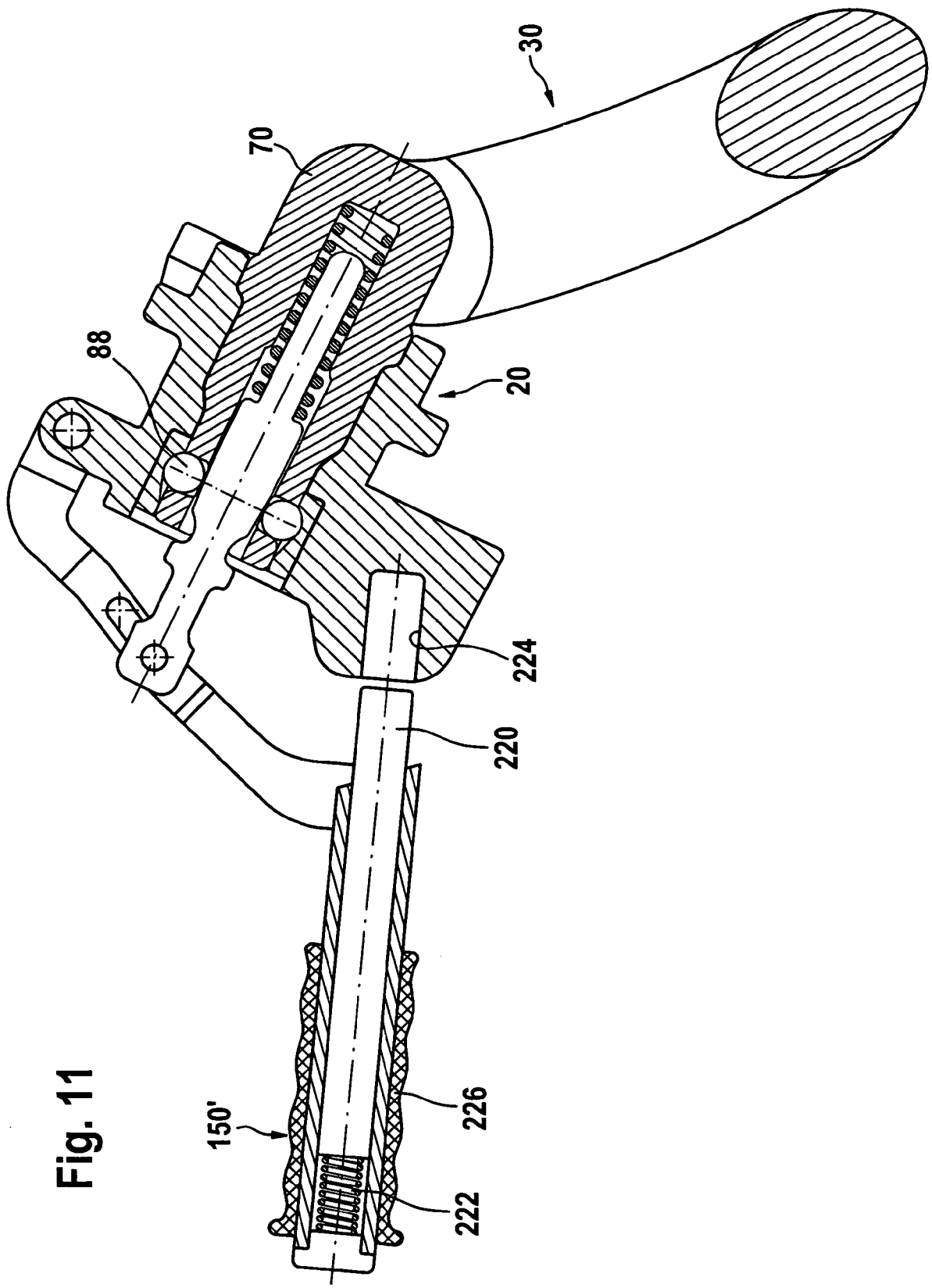
FIG. 11 shows a section similar to FIG. 10 with a released locking of the actuating device.

In addition, as a result of the displacement of the bearing member 70 in the opposite direction to the direction of displacement 156, a first form-locking element illustrated in FIGS. 2 and 7 in the form of a form-locking member 160 is moved out of a form-locking receiving means 162 in the receiving member 60, which represents a second form-locking element and is located on the side of the operative position, and is, therefore, pivotable freely about the pivot axis 52 in relation to an end side 164 of the receiving member 60, namely, as illustrated in FIG. 8, into the rest position R, in which the form-locking member 160 is again located opposite a third form-locking element in the form of a form-locking receiving means, which is not apparent and is located on the side of the rest position, and can be brought into engagement with it due to the fact that the bearing member 70 is again moved in the direction of displacement 156 into the fixing position.

In this respect, the form-locking member 160 preferably has two form-locking surfaces 170a, 170b which extend towards one another in a wedge shape and can abut on corresponding form-locking surfaces 162a, 162b of the form-locking receiving means 162 on the side of the operative position so that, as a result, when the form-locking member 160 is acted upon in a direction of displacement 156 in the direction of the fixing position the first form-locking surfaces 170a, 170b can abut on the form-locking surfaces 172a, 172b of the form-locking receiving means 162 on the side of the operative position without clearance.

Furthermore, as illustrated in FIG. 8, an additional, first form-locking element in the form of an additional form-locking member 180 is located opposite the form-locking member 160 and is apparent only in the rest position R on account of the perspective illustration.

This additional form-locking member 180 is, in principle, of the same design as the form-locking member 160 and, as illustrated in FIG. 8, can be inserted in the rest position R into an additional, third form-locking element in the form of a form-locking receiving means 182 on the side of the rest position. The additional form-locking member 180 also has form-locking surfaces 190a, 190b which can be brought into engagement with form-locking surfaces 192a, 192b of the form-locking receiving means 182 on the side of the rest position upon displacement thereof from the pivoting position into the fixing position.

Since the pivoting movement about the pivot axis 52 from the operative position into the rest position comprises a rotational movement, in particular, through approximately 180° and more and two form-locking members 160 and 180 located opposite one another are provided, and in order to prevent the first form-locking member 160 from locking into, for example, the additional form-locking receiving means 182 on the side of the rest position, the first form-locking member 160 is provided, in addition, with a guide pin 200, with which a guide path 202 is associated; this guide path is provided on the bearing element 20 and has a recess 204, into which the guide pin 200 can dip, only in the operative position A and—not illustrated in the drawings—in the rest position R.

As a result, it is ensured by means of the guide pin 200, which can be supported on the guide path 202 outside the operative position A and the rest position R, that the first form-locking member 160 can move in the direction of displacement 156 from the pivoting position into the fixing position only in the operative position A and in the rest position R and, therefore, can enter only the form-locking receiving means provided for it on the side of the operative position and the receiving means on the side of the rest position.

The guide pin 200 and the guide path 202 therefore prevent the bearing member 70 from being able to move from the pivoting position into the fixing position in all the intermediate positions between the operative position A and the rest position R.

As a result, the inactive position of the drive element 112 of the blocking member drive 110 illustrated in FIG. 6 is also maintained since the blocking members 88 located in the release position prevent any relative movement of the drive element 112 in relation to the bearing member 70 in the activation direction 116 since the blocking members 88 are supported in this position on the third cylindrical receiving surface 68 of the receiving member 60.

Since, in addition, the actuating element 142 is arranged coaxially to the pivot axis 52 and the drive element 112 is also arranged coaxially to the pivot axis 52, the bearing member 70 can turn about the pivot axis 52 whereas the actuating element 142 and the drive element 112 are held non-rotationally in relation to the pivot axis 52 by the guide lever 146 and, therefore, do not go with the rotation but rather remain non-rotational while the bearing member 70 rotates about the drive element 112 with the blocking members 88.

If the towing element 30 reaches the operative position A or the rest position R as a result of rotation about the pivot axis 52, the guide pin 200 has the possibility of dipping into the recess 204 insofar as the towing element 30 is acted upon manually in the opposite direction to the direction of displacement 156.

If the displacement is carried out to such an extent until the blocking members 88 again have the possibility of moving radially outwards into the groove 96, the activation element 112 acted upon by the elastic force storing means 130 has, at the same time, the possibility of displacing the connecting drive link 120 to such an extent that the displacement surface 124 moves the blocking members 88 from their release position in the direction of movement 92 towards the blocking position and, furthermore, the activation element 112 can be displaced to such an extent that after the blocking members 88 have reached the blocking position the connecting drive link 120 is displaced relative to them to such an extent that the wedge surfaces 126 act on the blocking members 88.

As a result of the fact that the blocking surfaces 98 extend at an angle to the direction of movement 92 in such a manner that the blocking members 88 moving in the direction of movement 92 act on the bearing member 70 via their guide openings 84 such that this experiences a force contrary to the direction of displacement 156 in the direction of the fixing position, this force also causes the form-locking surfaces 170a, 170b as well as 172a, 172b extending towards one another in a wedge shape as well as the form-locking surfaces 190a and 190b as well as 192a and 192b to abut on one another acted upon by a force and, therefore, to be held relative to one another free from clearance, which again results in a clearance-free and non-rotational positioning of the towing element 30 relative to the bearing element 20.

Moreover, to secure the fixing position of the actuating lever 150 a locking lever 210 is associated with it which is rotatable about a joint 212 and is supported on a nose 214 provided on the bearing element 20 in the fixing position of the bearing member and, therefore, in an activation position of the drive element 112 and corresponding position of the guide lever 146.

In order to maintain the position of the locking lever 210, in which this is supported on the nose 214, this is acted upon by a spring 216 in the direction of its support position so that any movement of the actuating lever 150 in the pulling direction 152 is only possible when the locking lever 210 is previously released from its support position on the nose 214 in the opposite direction to the action of the spring 216.

In a second embodiment, illustrated in FIGS. 9 to 12, those elements which are identical to those of the first embodiment are given the same reference numerals and so reference can be made in full to the explanations concerning the first embodiment with respect to the description thereof.

In contrast to the first embodiment, a locking bolt 220 is provided on the actuating lever 150' instead of the locking lever 210 and this locking bolt can be displaced by a pressure spring 222 in the direction of a bolt receiving means 224 provided in the bearing element 20 and also engages in this receiving means in the fixing position. In order to release the locking bolt 220 out of the locking bolt receiving means 224, a gripping element 226 is provided which can act on the locking bolt 220 in such a manner that this can be displaced in a release direction 228 relative to the actuating lever 150' to such an extent that it leaves the bolt receiving means 224 and, therefore, the actuating lever 150' can be pivoted in the pulling direction 152 in the manner already described in order to move the drive element 112 in the actuating direction 154 into its inactive position by means of the actuating element 142 contrary to the force of the elastic force storing means 130 and, at the same time, to move the bearing member 70 relative to the receiving member 60 from the fixing position into the pivoting position, in which it can be pivoted in the same way as that described in conjunction with the first embodiment.

Figure 12:
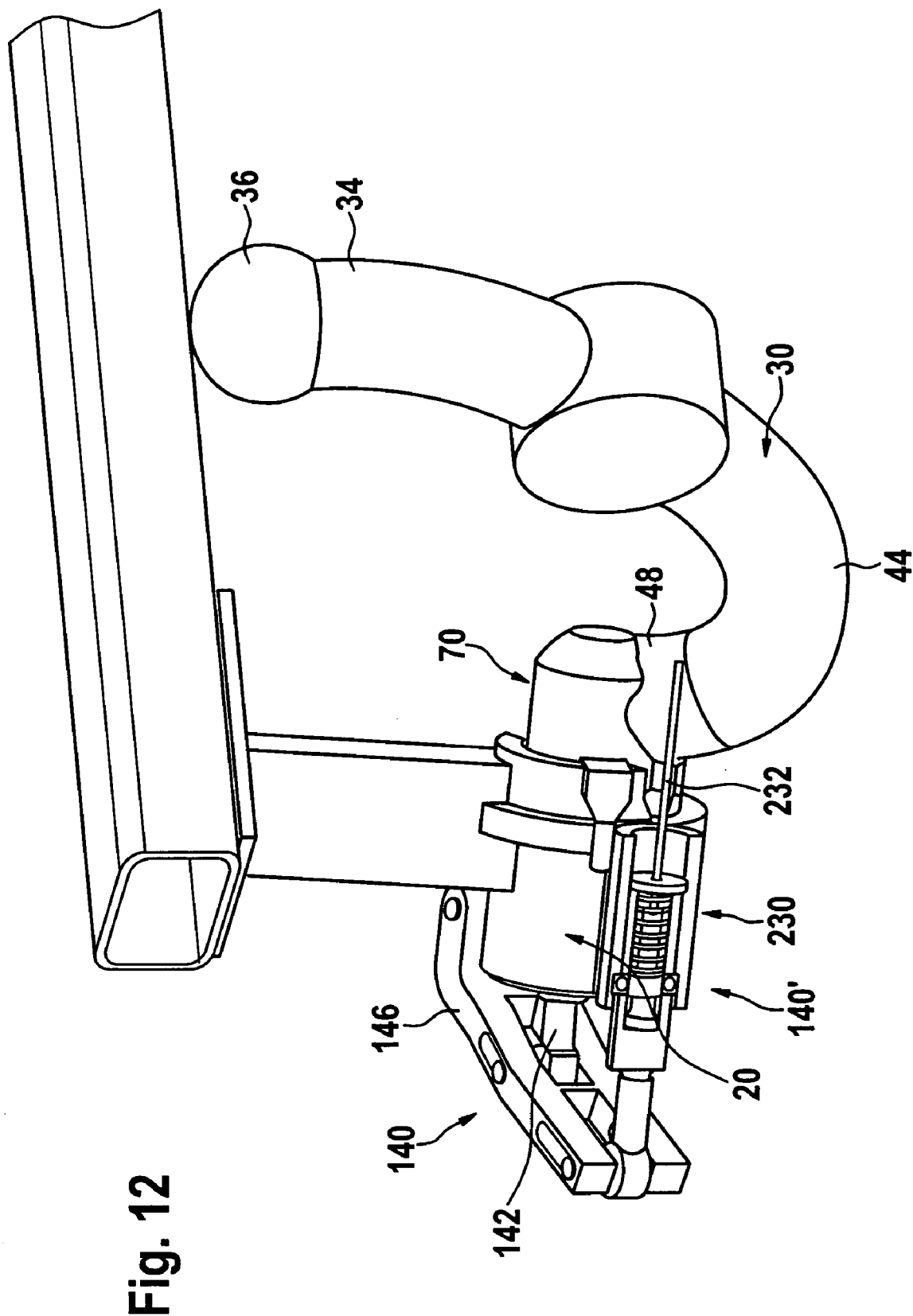
FIG. 12 shows an illustration similar to FIG. 2 of a third embodiment of an inventive trailer coupling.
Figure 13:
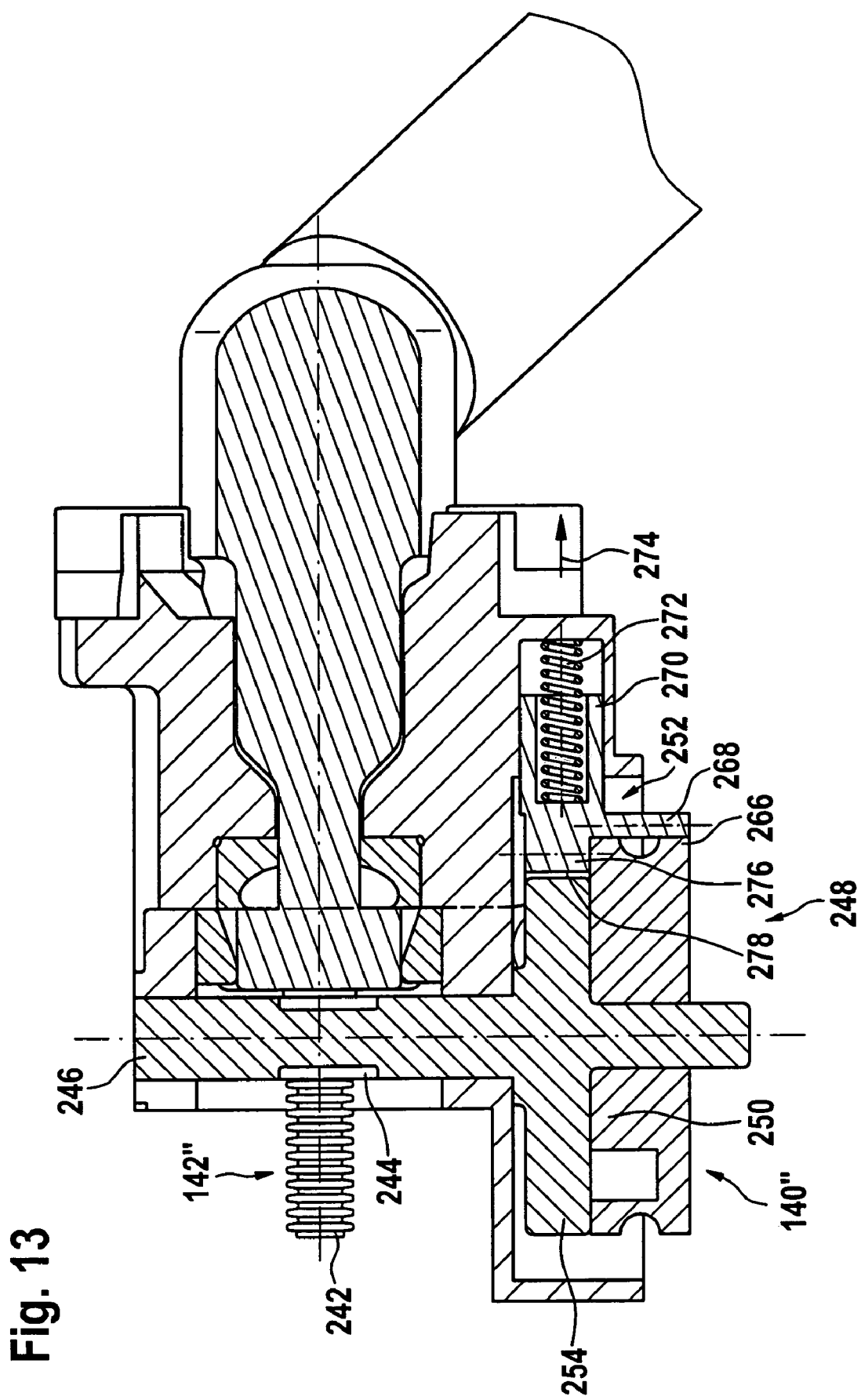
FIG. 13 shows a section along line 13—13 through a fourth embodiment of an inventive trailer coupling.

In a third embodiment, illustrated in FIG. 12, the actuating device 140', in particular, the guide lever 146 cannot be actuated directly by the actuating lever 150 but rather via a cable traction device 230 which creates the possibility of transferring the force to an actuating lever provided at a suitable location via a cable line 232.

As for the rest, the third embodiment is designed in the same way as the first embodiment and so with respect to the remaining elements reference is made in full to the explanations concerning the first embodiment and the same parts are also given the same reference numerals.

In a fourth embodiment, illustrated in FIGS. 13 to 16, those elements which are identical to those of the first embodiment are likewise given the same reference numerals and so with respect to the description thereof reference can be made in full to the explanations concerning the first embodiment.

In contrast to the preceding embodiments, the actuating device 140" in the fourth embodiment is designed as a rotary drive and comprises as actuating element 142' a toothed rack 242 which is in engagement with a pinion 244 of a drive shaft 246, wherein the drive shaft 246 can be driven by a rotary drive 248 with a free-wheeling means 250 as well as a locking device 252.

Figure 14:
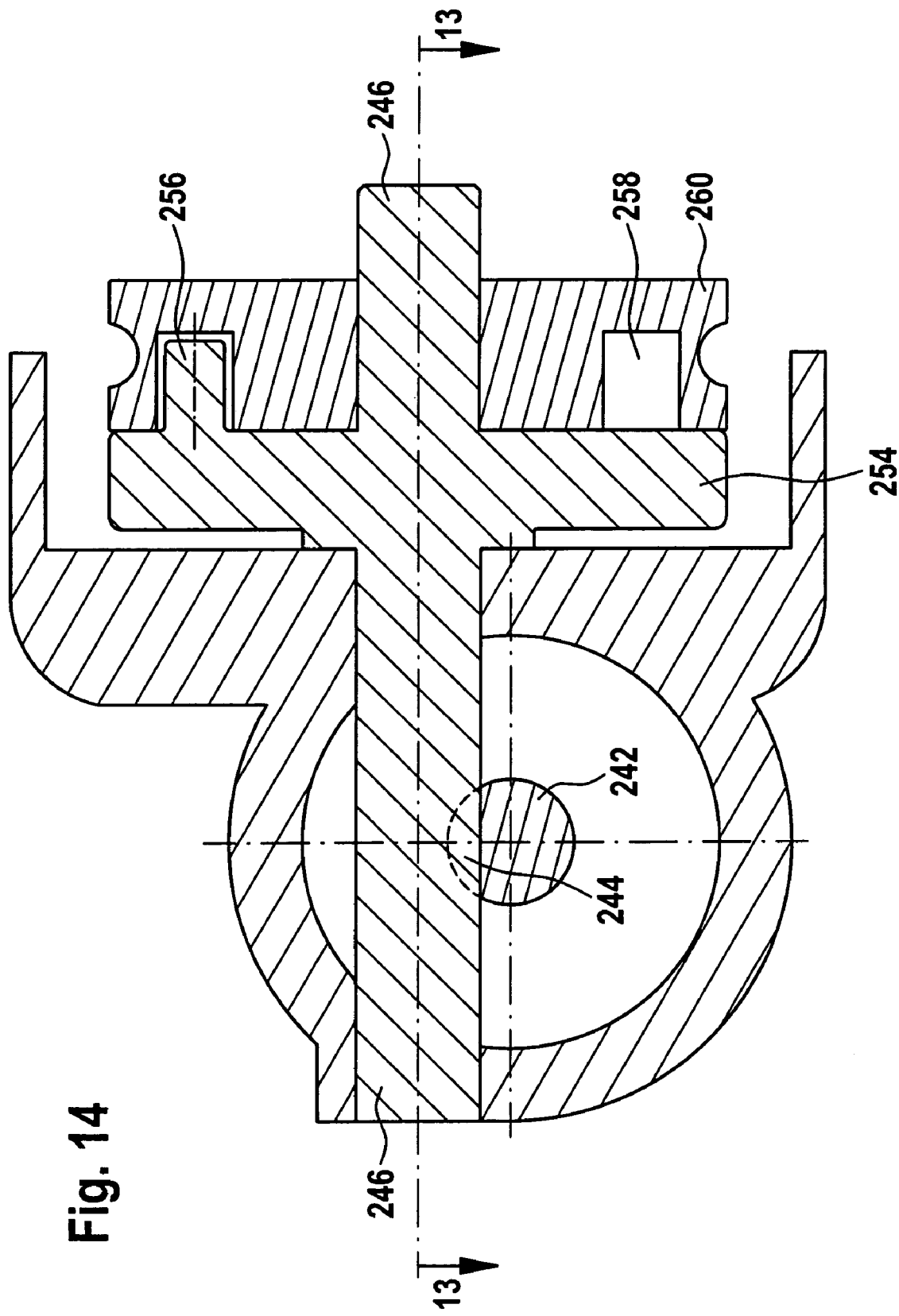
FIG. 14 shows a section along line 14—14 in FIG. 13.

The free-wheeling means 250 is formed by a free-wheeling disk 254 which, as illustrated in FIG. 14, bears an entraining means 256 which engages in an entraining groove 258 of an entraining disk 260 which is mounted so as to be rotatable in relation to the free-wheeling disk 254 and rotatable on the drive shaft 246.

Figure 15:
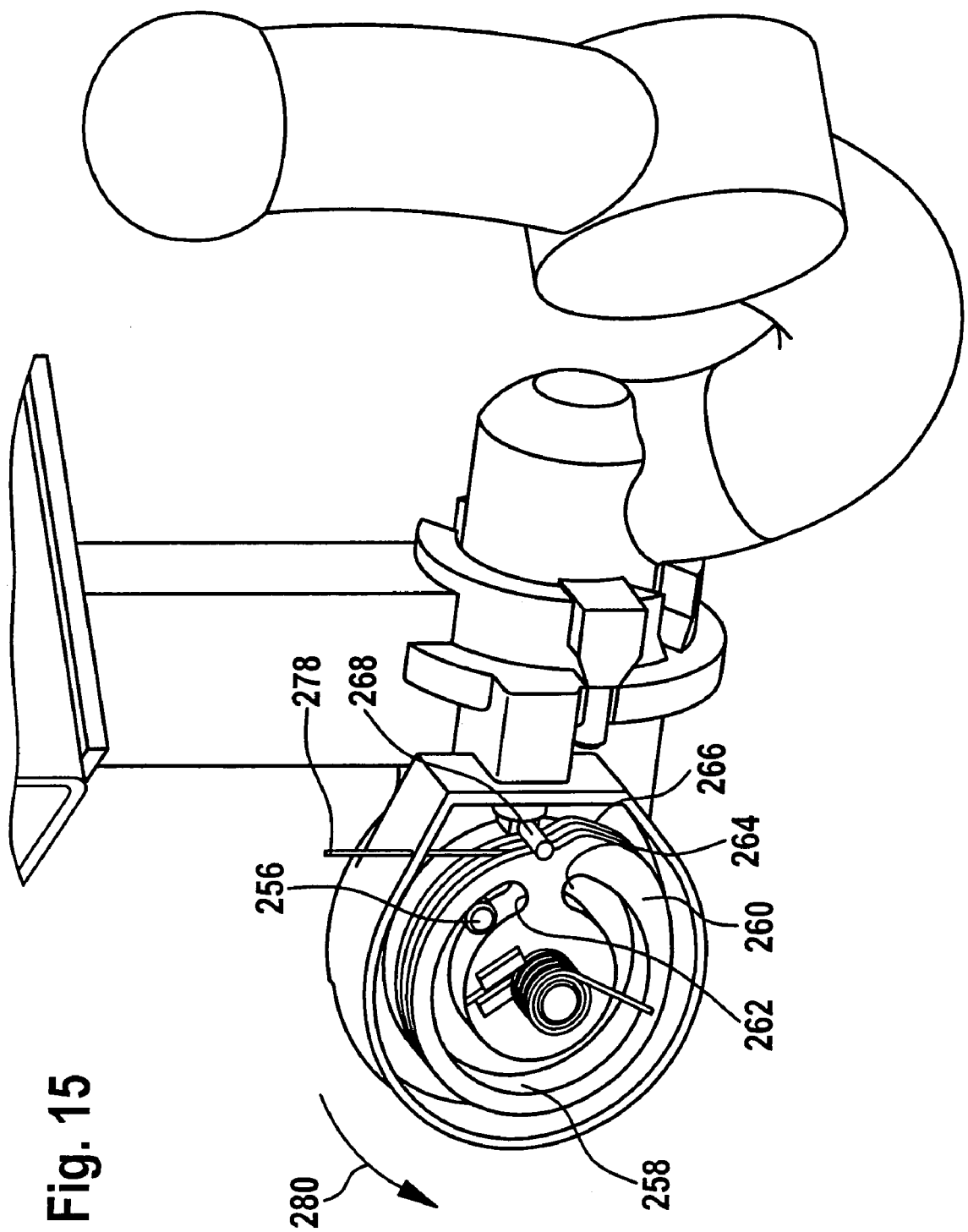
FIG. 15 shows a perspective illustration similar to FIG. 2 of the fourth embodiment of the inventive actuating device with complete blocking in a fixing position.

The entraining groove 258 has, as illustrated in FIG. 15, a first end 262 and a second end 264, between which the entraining means 256 can move freely in the entraining groove 258.

Furthermore, the entraining disk 260 is provided at its outer circumferential side with a connecting control link 266, with which a control pin 268 of a locking member 270 of the locking device 252 can be displaced, namely to the effect that the locking member 270 can be moved in a release direction 274 contrary to the force of a spring 272.

The locking member 270 has, in addition, a locking nose 276 which can be brought into engagement with a locking recess 278 in the free-wheeling disk 254 when the free-wheeling disk 254 which is coupled non-rotationally to the drive shaft 246 is in a position corresponding to the active position of the drive element 112. In this position, the rotational movement of the free-wheeling disk 254 is blocked by the locking nose 276 of the locking member 270 and, therefore, the actuating element 142' is also secured against any movement in the actuating direction 154.

If the drive element 112 is now to be displaced from its active position into its inactive position, the entraining disk 260 is rotated, for example, by means of a cable line 278.

Figure 16:
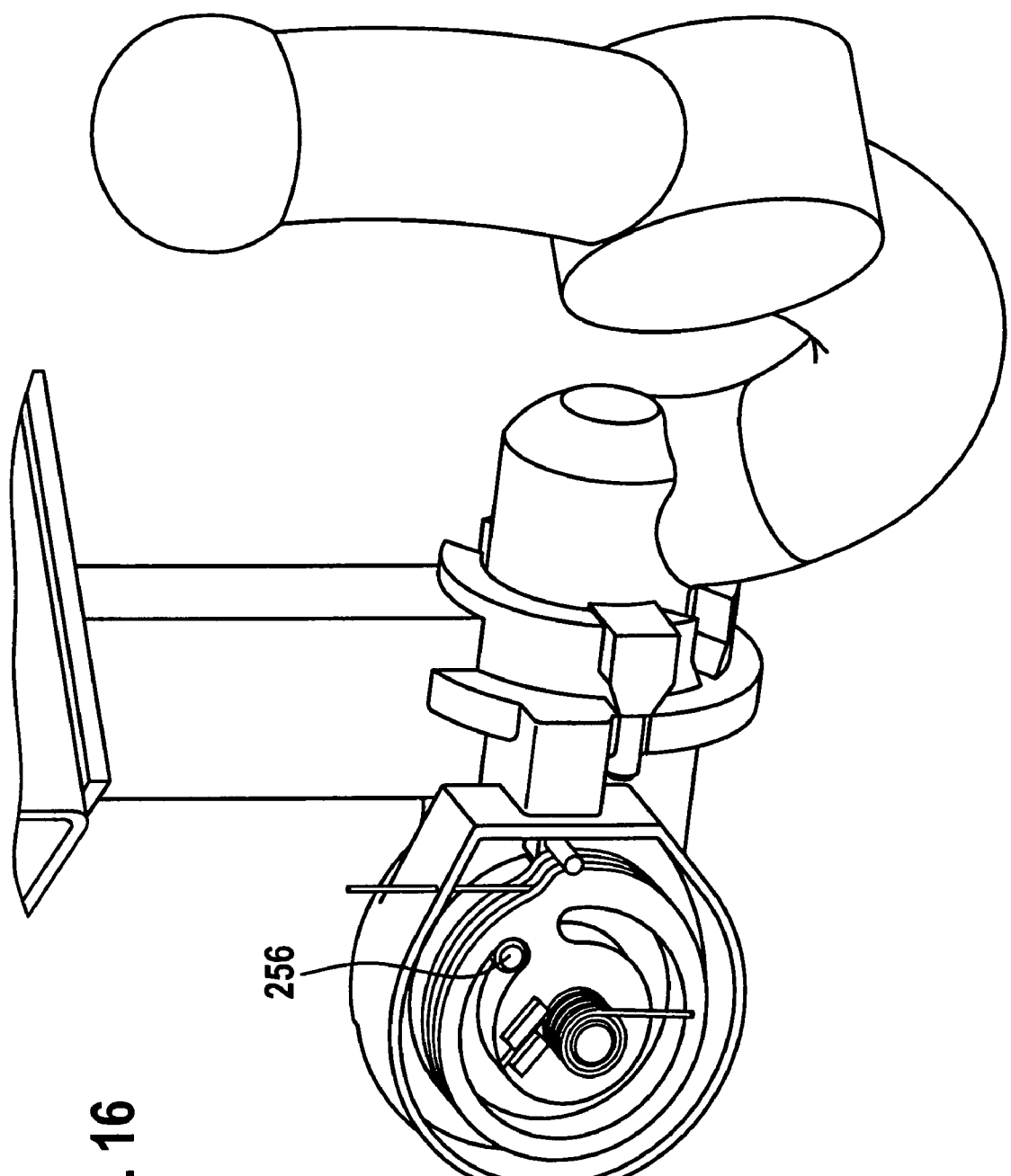
FIG. 16 shows an illustration similar to FIG. 15 with a freely rotatable freewheeling disk.

Since the entraining means 256 is at a distance from the first end 262 of the entraining groove 258 in the position of the free-wheeling disk 254 fixed by the locking member 270 (FIG. 15), the entraining disk 260 can first of all be rotated in a direction of rotation 280 for such a time until the entraining means 256 abuts on the end 262 of the entraining groove 258 (FIG. 16). This distance is sufficient for the control pin 268 of the locking member 270 to be acted upon by means of the connecting control link 266 and, therefore, for the locking member 270 to be moved in a release direction 274 contrary to the force of the spring 272 and, consequently, for the rotational movement of the free-wheeling disk 254 to be released.

Figure 17:
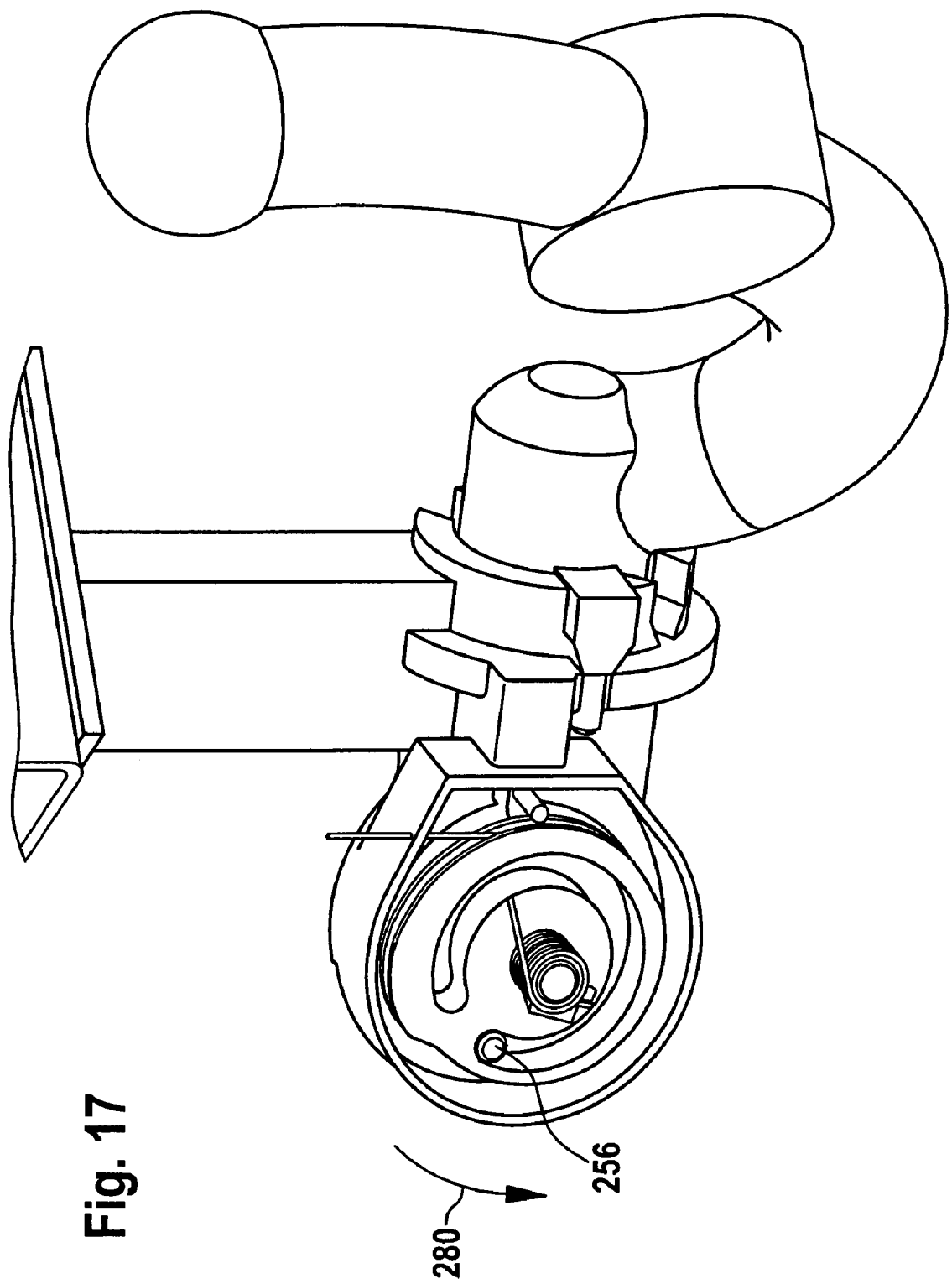
FIG. 17 shows an illustration similar to FIG. 15 with a drive element of a blocking member drive being acted upon with the actuating device of the fourth embodiment and FIG. 18 shows an illustration similar to FIG. 15 with a towing element extended in pivoting position by means of the actuating device.

The free-wheeling disk 254 is entrained in that the entraining means 256 abuts on the end 262 of the entraining groove 258 and is turned further with the entraining disk 260, as illustrated in FIGS. 16 and 17.

Figure 18:
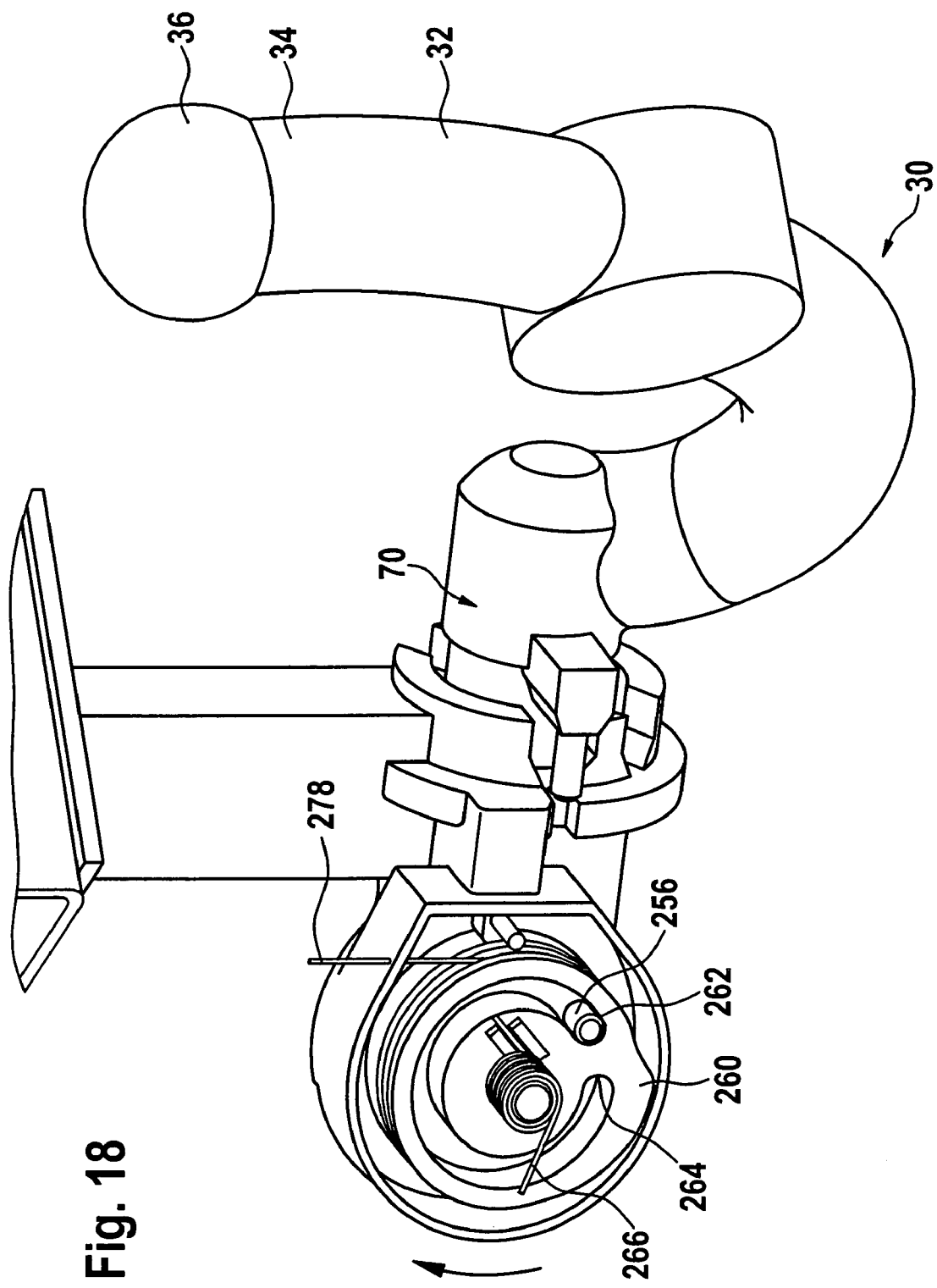

As a result, the drive shaft 246 is rotated accordingly and, therefore, the toothed rack 242 is acted upon via the pinion 244 in the sense of a displacement of the actuating element 142' in the actuating direction 154 for such a time until the pivoting position of the towing element 30 is reached, as illustrated in FIG. 18.

In the inactive position of the drive element 112, the pulling effect on the cable line 278 can be dispensed with and the entraining disk 260 has the possibility of rotating back into its initial position acted upon by a pressure spring 282 in the direction opposite to the direction of rotation 280 while the free-wheeling disk 254 can remain with the entraining means 256 in a position corresponding to the inactive position of the drive element 112 and the pivoting position of the towing element 30 for such a time until the towing element 30, either in the operative position A or the rest position R, is displaced again in the direction of displacement 156 into the fixing position and the drive element 112 transfers into its active position in the fixing position. In this respect, the entraining means 256 can then move freely back into the position illustrated in FIG. 15 and a non-rotational locking of the free-wheeling disk 254 again takes place due to the fact that the locking nose 276 of the locking member 270 dips into the locking recess 278.

The invention claimed is:

1. Trailer coupling for motor vehicles, comprising;
a bearing element having a receiving member,
a towing element having a bearing member, said towing element being pivotable in relation to the bearing element about a pivot axis of a pivot bearing between an operative position and a rest position and displaceable in a direction of displacement parallel to the pivot axis between a pivoting position and a fixing position at least in the operative position,
the bearing member engaging in said receiving member at least in the fixing position,
the bearing member being movable in relation to said receiving member between the pivoting position and the fixing position in the direction of displacement and vice versa, and
a fixing device for fixing the towing element in position on the bearing element so as to be unmovable at least in the operative position and upon reaching the fixing position, said fixing device having a blocking device blocking the bearing member with respect to any movement in the direction of displacement relative to the receiving member,
said blocking device having at least one blocking member arranged on one of the elements and movable from a release position in a direction of a blocking position acted upon by a force and at least one blocking surface arranged on the other one of the elements, and said blocking member engaging behind said blocking surface in the blocking position.

2. Trailer coupling as defined in claim 1, wherein the bearing member mounts the towing element in relation to the receiving member not only in the pivoting position but also in the fixing position.

3. Trailer coupling as defined in claim 1, wherein the towing element has a first end bearing the coupling ball as well as a second free end.

4. Trailer coupling as defined in claim 3, wherein the bearing member is arranged on the towing element between a ball neck of the coupling ball and the second free end.

5. Trailer coupling as defined in claim 1, wherein the receiving member has a first opening, the bearing member engaging in the receiving member through said opening and a second opening located opposite the first opening.

6. Trailer coupling as defined in claim 1, wherein the blocking device has a blocking member drive for acting on the blocking member with the force moving it from the release position in the direction of the blocking position.

7. Trailer coupling as defined in claim 6, wherein the blocking member drive has a drive element for moving the blocking member from the release position into the blocking position.

8. Trailer coupling as defined in claim 7, wherein the drive element is adapted to be acted upon by an elastic force storing means.

9. Trailer coupling as defined in claim 6, wherein the drive element is arranged to be displaceable in an activating direction relative to the element accommodating it.

10. Trailer coupling as defined in claim 9, wherein:
the drive element has a connecting drive link with a receiving means, the at least one blocking member dipping into said receiving means in the release position, and
a displacement surface, the at least one blocking member being movable with said surface from the release position into the blocking position.

11. Trailer coupling as defined in claim 10, wherein a wedge-shaped surface adjoins the displacement surface and acts on the blocking member in the blocking position in a readjusting manner in the direction of movement.

12. Trailer coupling as defined in claim 1, wherein the blocking device holds form-locking fixing elements of the fixing device in clearance-free engagement.

13. Trailer coupling as defined in claim 1, wherein the blocking device acts on the form-locking fixing elements in a clearance-free, readjusting manner.

14. Trailer coupling as defined in claim 1, wherein, the blocking position of the at least one blocking member, the blocking device acts on the bearing member with a force in a direction of the fixing position on account of the interaction of the blocking member with the blocking surface.

15. Trailer coupling as defined in claim 14, wherein the blocking surface extends at an angle to the direction of movement.

16. Trailer coupling as defined in claim 1, wherein the at least one blocking member and a blocking member drive are arranged in the bearing member.

17. Trailer coupling as defined in claim 16, wherein the at least one blocking member is guided in the bearing member so as to be movable between the release position and the blocking position in a direction of movement transverse to the direction of displacement thereof.

18. Trailer coupling as defined in claim 1, wherein in the pivoting position of the towing element the receiving member holds the at least one blocking member in the release position.

19. Trailer coupling as defined in claim 18, wherein the receiving member has a surface acting on the at least one blocking member.

20. Trailer coupling as defined in claim 1, wherein the at least one blocking member is provided on the towing element on a side of the bearing member facing away from a ball neck.

21. Trailer coupling as defined in claim 20, wherein the at least one blocking member is arranged in lateral guide openings of the towing element in the direction of movement.

22. Trailer coupling as defined in claim 21, wherein the lateral guide openings are arranged close to a free end of the towing element.

23. Trailer coupling as defined in claim 1, wherein the bearing member has a guide path, a guide element being arranged on the towing element and resting on said guide path when the towing element is outside the operative position and the rest position.

24. Trailer coupling for motor vehicles, comprising:
a bearing element having a receiving member,
a towing element having a bearing member, said towing element being pivotable in relation to the bearing element about a pivot axis of a pivot bearing between an operative position and a rest position and displaceable in a direction of displacement parallel to the pivot axis between a pivoting position and a fixing position at least in the operative position,
the bearing member engaging in said receiving member at least in the fixing position,
the bearing member being movable in relation to said receiving member between the pivoting position and the fixing position in the direction of displacement and vice versa, and
a fixing device for fixing the towing element in position on the bearing element so as to be unmovable at least in the operative position and upon reaching the fixing position, said fixing device having a blocking device blocking the bearing member with respect to any movement in the direction of displacement relative to the receiving member,
said blocking device having at least one blocking member and a blocking member drive arranged on one of the elements, and having at least one blocking surface arranged on the other one of the elements, said blocking member being movable from a release position in a direction of a blocking position by said blocking member drive, and
said blocking member engaging behind said blocking surface in the blocking position,
the blocking device comprising an actuating device acting on the blocking member drive, said actuating device being adapted for acting on a drive element of the blocking member drive contrary to a force of an elastic force storing means comprised by said blocking member drive.

25. Trailer coupling as defined in claim 24, wherein an actuating element is coupled to a guide lever of the actuating device.

26. Trailer coupling as defined in claim 25, wherein the guide lever is pivotally mounted on the bearing element.

27. Trailer coupling as defined in claim 24, wherein the actuating element is designed as a toothed rack meshing with a pinion of the actuating device.

28. Trailer coupling as defined in claim 24, wherein the actuating device is provided with a free-wheeling means provided between the actuating element and an operative element.

29. Trailer coupling as defined in claim 24, wherein the drive element is arranged in a recess in the towing element.

30. Trailer coupling as defined in claim 29, wherein the recess extends into the towing element from an opening provided at a free end of the towing element.

31. Trailer coupling as defined in claim 29, wherein the recess extends coaxially to the pivot axis.

32. Trailer coupling as defined in claim 29, wherein the elastic force storing means is supported on a base of the recess located opposite the opening.

33. Trailer coupling for motor vehicles, comprising:
a bearing element having a receiving member,
a towing element having a bearing member, said towing element being pivotable in relation to the bearing element about a pivot axis of a pivot bearing between an operative position and a rest position and displaceable in a direction of displacement parallel to the pivot axis between a pivoting position and a fixing position at least in the operative position,
the bearing member engaging in said receiving member at least in the fixing position,
the bearing member being movable in relation to said receiving member between the pivoting position and the fixing position in the direction of displacement and vice versa, and
a fixing device for fixing the towing element in position on the bearing element so as to be unmovable at least in the operative position and upon reaching the fixing position, said fixing device having a blocking device blocking the bearing member with respect to any movement in the direction of displacement relative to the receiving member,
said blocking device having at least one blocking member and a blocking member drive arranged on the bearing member, and having at least one blocking surface arranged on the receiving member, said blocking member being movable by said blocking member drive from a release position in a direction of a blocking position by said blocking member drive, and
said blocking member engaging behind said blocking surface in the blocking position,
said blocking device further comprising an actuating device having an actuating portion arranged on the bearing element and an actuating element for acting on the blocking member drive.

34. Trailer coupling as defined in claim 33, wherein the actuating element of the actuating device projects beyond a free end of the towing element.

35. Trailer coupling as defined in claim 34, wherein the actuating element is arranged coaxially to the pivot axis.

36. Trailer coupling as defined in claim 35, wherein the actuating element is mounted on the towing element to be rotatable about the pivot axis.

37. Trailer coupling as defined in claim 36, wherein the actuating element is adapted to be acted upon in the direction of the free end of the towing element in its area projecting beyond the free end of the towing element for the purpose of neutralizing the force of the elastic force storing means acting on the drive element.

38. Trailer coupling motor vehicles, comprising:

a bearing element having a receiving member, a towing element having a bearing member, said towing element being pivotable in relation to the bearing element about a pivot axis of a pivot bearing between an operative position and a rest position and displaceable in a direction of displacement parallel to the pivot axis between a pivoting position and a fixing position at least in the operative position, the bearing member engaging in said receiving member at least in the fixing position, the bearing member being movable in relation to said receiving member between the pivoting position and the fixing position in the direction of displacement and vice versa, and a fixing device for fixing the towing element in position on the bearing element so as to be unmovable at least in the operative position and upon reaching the fixing position, said fixing device having a blocking device blocking the bearing member with respect to any movement in the direction of displacement relative to the receiving member, said blocking device having at least one blocking member and a blocking member drive arranged on one of the elements, and at least one blocking surface arranged on the other one of the elements, said blocking member movable from a release position in a direction of a blocking position by said blocking member drive, and said blocking member engaging behind said blocking surface in the blocking position, said blocking device further comprising an actuating device for actuating the blocking member drive, said actuating device being adapted to displace the towing element from the fixing position into the pivoting position after moving the blocking member from the blocking position in the release position.

39. Trailer coupling as defined in claim 38, wherein in the pivoting position the towing element is positionable in a defined manner in the direction of displacement by means of the actuating device.

40. Trailer coupling for motor vehicles, comprising:

a bearing element having a receiving member with an opening, a towing element pivotable in relation to the bearing element about a pivot axis of a pivot bearing between an operative position and a rest position and displaceable in a direction of displacement parallel to the pivot axis between a pivoting position and a fixing position at least in the operative position, a bearing member of the towing element engaging in the receiving member opening, and a fixing device for fixing the towing element in position on the bearing element so as to be unmovable at least in the operative position and upon reaching the fixing position, the towing element having a first form-locking element, the receiving member having a second form-locking element provided at an end area thereof, said first form-locking element being out of engagement with the second form-locking element in the pivoting position of the towing element and being adapted to be brought into engagement with the second form-locking element receiving at least in the operative position during displacement of the towing element from the pivoting position into the fixing position.

41. Trailer coupling as defined in claim 40, wherein the second form-locking element is arranged on a side of the receiving member facing a ball neck.

42. Trailer coupling as defined in claim 40, wherein the second form-locking element is arranged in the end area of the receiving member.

43. Trailer coupling as defined in claim 40, wherein the second form-locking element is integrally formed on the receiving member.

44. Trailer coupling as defined in claim 40, wherein the first form-locking element is integrally formed on the towing element.

45. Trailer coupling as defined in claim 40, wherein the first form-locking element is arranged in an area of a transition from a ball neck to the bearing member.

46. Trailer coupling as defined in claim 40, wherein the receiving member has a third form-locking element, the first form-locking element being adapted to be brought into engagement with said third form-locking element in the rest position.

47. Trailer coupling as defined in claim 46, wherein the third form-locking element is of an identical design to the second form-locking element.

* * * * *

UNITED STATES PATENT AND TRADEMARK OFFICE
CERTIFICATE OF CORRECTION

PATENT NO. : 7,216,886 B2 Page 1 of 1
APPLICATION NO. : 11/039081
DATED : May 15, 2007
INVENTOR(S) : Rimmelspacher et al.

It is certified that error appears in the above-identified patent and that said Letters Patent is hereby corrected as shown below:

Column 14, line 51: after the word "wherein," add the word -- in --.

Column 17, line 1: after the word "coupling" add the word -- for --.

Column 18, line 18: delete the word "receiving" at the beginning of the line.

Signed and Sealed this

Twenty-fourth Day of July, 2007

JON W. DUDAS
*Director of the United States Patent and Trademark Office*